United States Patent
Dell'Uomo et al.

(10) Patent No.: US 8,681,752 B2
(45) Date of Patent: Mar. 25, 2014

(54) METHOD AND SYSTEM FOR DYNAMIC SELECTION OF HOME AGENTS

(75) Inventors: Luca Dell'Uomo, Turin (IT); Marco Spini, Turin (IT)

(73) Assignee: Telecom Italia S.p.A., Milan (IT)

( * ) Notice: Subject to any disclaimer, the term of this patent is extended or adjusted under 35 U.S.C. 154(b) by 1878 days.

(21) Appl. No.: 11/658,763

(22) PCT Filed: Jul. 30, 2004

(86) PCT No.: PCT/EP2004/008586
§ 371 (c)(1),
(2), (4) Date: Jan. 29, 2007

(87) PCT Pub. No.: WO2006/010382
PCT Pub. Date: Feb. 2, 2006

(65) Prior Publication Data
US 2009/0080387 A1    Mar. 26, 2009

(51) Int. Cl.
*G06F 15/16* (2006.01)
*H04W 4/00* (2009.01)
*H04L 12/16* (2006.01)
*H04Q 11/00* (2006.01)

(52) U.S. Cl.
USPC .......................... 370/338; 370/270; 709/229

(58) Field of Classification Search
USPC .......................... 370/270, 338, 401; 709/229
See application file for complete search history.

(56) References Cited

U.S. PATENT DOCUMENTS

| | | | |
|---|---|---|---|
| 6,240,091 B1 * | 5/2001 | Ginzboorg et al. | 370/401 |
| 2003/0095522 A1 | 5/2003 | Korus et al. | |
| 2003/0223439 A1 | 12/2003 | O'Neill | |
| 2004/0098507 A1 * | 5/2004 | Thubert et al. | 709/245 |

FOREIGN PATENT DOCUMENTS

| | | |
|---|---|---|
| EP | 1 175 123 A2 | 1/2002 |
| EP | 1 139 634 B1 | 12/2006 |
| WO | WO 03/034659 A1 | 4/2003 |
| WO | WO 03/096650 A1 | 11/2003 |
| WO | WO 2004/017172 A2 | 2/2004 |

OTHER PUBLICATIONS

Simulation Study on Load Balanced Multiple Home Agents for Mobile IP Networks; Vasilache, Adrian, Li, Jie, Kameda, Hisao; University of Tsukaba, Tsukaba, Japan, 2000.*
3GPP TS 23.060 V3.16.0, 3rd Generation Partnership Project; Technical Specification Group Services and System Aspects; General Packet Radio Sevice (GPRS); Service Description; Stage 2, pp. 1-140, Dec. 2003).

(Continued)

*Primary Examiner* — Ariel Balaoing
*Assistant Examiner* — Larry Sternbane
(74) *Attorney, Agent, or Firm* — Finnegan, Henderson, Farabow, Garrett & Dunner, L.L.P.

(57) ABSTRACT

In a network wherein nodes request services adapted to be provided via a plurality of home agents, a system includes nodes configured for having associated a service identifier identifying a service requested by the at least one node, the system being configured for selecting the home agents to provide the services requested, wherein the home agents are selected based on the service identifiers. A node may thus have a first service identifier and a second service identifier identifying two different services adapted to be provided, even simultaneously, by a first and a second home agent respectively.

24 Claims, 15 Drawing Sheets

(56) References Cited

OTHER PUBLICATIONS

3GPP TS 23.003 V3. 14.0, 3rd Generation Partnership Project; Technical Specification Group Core Netword; Numbering, addressing and identification, (Release 1999); pp. 1-34, (Dec. 2003).

Draft 3GPP TS 23.234 V1.10.0, "3rd Generation Partnership Project; Technical Specification Group Services and System Aspects; 3GPP system to Wireless Local Area Network (WLAN) Interworking; System Description (Release 6)"; pp. 1-74, (May 2003).

Perkins, "IP Mobility support for IPv4"; Network Working Group, Request for Comments: 3344, pp. 1-87, (Aug. 2002).

Johnson, et al., "Mobility Support in IPv6, draft-ietf-mobileip-ipv6-24.txt"; IETF Mobile IP Working Group, Internet-Draft, pp. 1-151, (Jun 30, 2003).

Kulkarni, et al., "Mobile IPv4 Dynamic Home Agent Assignment, draft-kulkami-mobileip-dynamic-assignment-02.txt"; Mobile IP Working Group, Internet-Draft, pp. 1-20, (Oct. 20, 2003).

Chaskar, "Requirements of a Quality of Services (QoS) Solution for Mobile IP"; Network Working Group, Request for Comments: 3583, pp 1-9, (Sep. 2003).

* cited by examiner

METHOD AND SYSTEM FOR DYNAMIC SELECTION OF HOME AGENTS

CROSS REFERENCE TO RELATED APPLICATION

This application is a national phase application based on PCT/EP2004/008586, filed Jul. 30, 2004, the content of which is incorporated herein by reference.

FIELD OF THE INVENTION

The present invention relates to techniques for controlling operation of communication networks, and was developed by paying specific attention to the possible application to selecting dynamically one or more Home Agents at the same time on the basis of the services requested by the end-user in a network permitting user mobility (including so-called "nomadism").

DESCRIPTION OF THE RELATED ART

The diffusion of Wireless Local Area Network (WLAN) services and the interest of mobile operators to offer to its customer the mobile services using both the 2G (Second Generation) and 3G (Third Generation) system and the Wireless LAN has made necessary to integrate the two technologies. So Third Generation Partnership Project (3GPP) has started to develop new standard specifying how to perform such integration. Furthermore a key point for the future success is to provide services independently from the supporting technology, i.e. 2G or 3G or WLAN and to support the session continuity when the user is moving is moving from 2G/3G system to WLAN system and viceversa.

From the point of view of the end-user, the problem is to select the services, while from the network point of view the main problems is to support an efficient service selection procedure and at the same time to support the session continuity.

Standards for cellular mobile networks, such as 3GPP TS 23.060: "General Packet Radio Service (GPRS) Service description, Stage 2", and 3GPP TS 23.003: "Numbering, Addressing and Identification", for GPRS (General Packet Radio Service) and UMTS (Universal Mobile Telecommunication Network), indicate that the selection of services and the related actions to provide the services to the users should be triggered by the so-called Access Point Name. This identifies the particular network that is able to provide the selected service. This approach is essentially related to the mobility protocol GPRS Tunneling Protocol (GTP) that is started taking into account the service that is accessed by the mobile user. However, the Access Point Network has no meaning for service selection outside the scope of Third Generation Partnership Project (3GPP). This means that for Packet Data Network (PDN) handling such as required by e.g. mobility by means of the Mobile IP protocol, no relationship is specified between mobility management and access to the service.

For WLAN inter-working with a mobile network, the 3GPP TS 23.234 "3GPP system to Wireless Local Area Network (WLAN) interworking: system description", v1.11.0, standard proposes that the Wireless Access Point Network should be used for the selection of services. Service selection is performed selecting an entity, i.e. a so-called Packet Data Gateway (PDG), with functions similar to a mobile Gateway GPRS Support Node (GGSN). In 2G or 3G networks, the user in roaming conditions (i.e. currently covered by a Visited network) is able to access at the same time services offered by the Visited network and by his Home network.

Currently, a solution to support the session continuity in IP communication network is Mobile IP (MIP) standard.

General information on the Mobile IP standard, as defined by the Internet Engineering Task Force (IETF), can be found for Mobile IPv4 in C. Perkins, "IP Mobility Support for IPv4" <RFC 3344>, August 2002, and for Mobile IPv6 in Dave Johnson, Charles Perkins, Jari Arkko, "Mobility Support in IPv6", <draft-ietf-mobileip-ipv6-24>, July 2003.

Throughout this description, reference will be made to such IETF/RFC documents that are currently available at the filing date of this application with the Website of IETF at www.ietf.org/.

A Home Agent, in general, is a router on a mobile node's home link with which the mobile node has registered its current care-of address. While the mobile node is away from home, the home agent intercepts packets on the home link destined to the mobile node's home address, encapsulates them, and tunnels them to the mobile node's registered care-of address.

In the case of Mobile IPv4, the Home Agent is statically defined for a user. Conversely, in Mobile IPv6, the Home Agent is selected in a list provided by the Mobile Router Advertisement. In either case, the Home Agent is selected on a "Network Access Identifier" basis.

In a multi-access network, comprising e.g. 2G (Second Generation) and 3G (Third Generation) mobile networks, in possible combination with Wireless LAN or wired LAN networks, the resultant network is able to support the mobility of the user in the different networks, while allowing the user to move without discontinuing the sessions open while moving.

A possible solution to this problem is represented by the Mobile IP protocol.

In a worldwide environment, comprising 2G and 3G networks, the user can easily continue to use the mobile terminal in several countries. Additionally the user can keep active his or her open sessions while crossing country borders (as may frequently be the case in Europe) thus passing from a network to another, while also switching from a technology to another.

In this environment, correct and efficient management of the services is a mandatory requirement.

The standard solution used in 2G and 3G networks for service selection and supply is based on the so-called Access Point Name (APN) method.

In the Access Point Name method the user indicates the requested service to the network. In the case of a mobile user, the network chooses the server that should provide the service requested to that specific user. The network can choose a server in the Home network of the user or a server in the Visited network.

Moreover, the Access Point Name method allows the network to perform different operations and to dynamically select the server that provides the specific service.

In the case of multi-access networks, the standard TS 23.234, defines a Wireless Access Point Name for the selection of the services. The selection of the services is performed choosing an entity, designated Packet Data Gateway (PDG), which provides functionalities similar to a mobile Gateway GPRS Support Node (GGSN). Furthermore, in 2G or 3G networks, the mobile user connected with a Visited network, (i.e. in roaming), is able to access the services offered both by the Visited network and by the Home network.

In a multi-access network, the capability to support session continuity and handover while the user is moving between different networks is essential and can be supported by means of the Mobile Internet Protocol (MIP). Therefore, in a multi-access network, the user shall be able to access services provided by the Home network and by the Visited network, both from 2G/3G networks and from wireless or wired LAN networks. Moreover, session continuity, and network handover, shall be supported.

When the method used to support the session continuity is Mobile IP, the selected Home Agent is located within the Home network. Consequently, when the mobile user is connected with a Visited network, for example in another country, and the user tries to access the services provided by the Visited network, the flow of data packets is fed from the user to the Home Agent resident in the Home network. The Home Agent feeds the received flow of data packets to the server within the Visited Network passing through several transmission networks.

Due to the long distance between the end terminals, the Quality of Service (QoS) may be poor and, from the point of view of the network operator, the usage of transmission resources may not be particularly efficient.

Quality of Service and efficiency of the transmission can be improved by the presence of a second Home Agent, located within the Visited network (that can be easily paralleled to a Virtual Home network). This requires having more than one Home Agent simultaneously active.

The draft RFC, Milind Kulkarni, Alpesh Patel, Kent Leung "Mobile IPv4 Dynamic Home Agent Assignment", October 2003, <draft-kulkarni-mobileip-dynamic-assignment-02.txt>, proposes a method for a dynamic selection of the Home Agent, based on the user network domain.

Additional literature addressing the issue of selecting a Home Agent includes:

H. Chaskar, "Requirements of a Quality of Service (QoS) Solution for Mobile IP", <RFC 3583>, September 2003, as well as EP-A1-075 123, EP-A1-139 634, US 2003 0095522-A1, US 2003 0223439-A1 and WO-A-03/096650.

As a rule, the prior art methods considered in the foregoing do not allow the user to register with more than one Home Agent (that could be both in the Visited or the Home network).

Additionally, the Home Agent is not in a position to filter the packets sent on the basis of the requested service. The user may in fact wish to be reached only for certain services, while being unreachable for other services (this may be due e.g. to privacy reasons, limited user equipment capabilities and/or resources, etc. . . . ).

When a Mobile Node using at least one wireless network interface moves within the wireless transmission coverage of more than one Foreign Agent, it can be useful to have multiple simultaneous mobility bindings not related to its home domain, but based on the services that user is requesting or receiving. This possibility is not offered in current networks.

Even in the case of multiple simultaneous bindings, a separate copy of each arriving datagram is tunneled to each Care-of Address, and the mobile node receives multiple copies of datagrams destined to it. Since the Home Agent always duplicates packets to all the registered Care-of addresses, it is not possible to have multiple Care-of Addresses on which the Mobile Node receives different services.

An additional problem is represented by the inability of the Mobile Node to discriminate between packets that require different treatments depending on the kind of service(s) (i.e. different Quality of Service, different Security levels, etc. . . . ) provided by means of the data stream including a given packet.

At the moment, no possibility exists of registering the Mobile Node with more than one Home Agent (that could be both in the Visited or in the Home network).

An additional problem for a network operator lies in the necessity of offering a certain services in one geographical area or in a particular IP sub-net instead of another. It would be desirable, based on the network operator policy, to permit access to a certain set of services only when the mobile user is located in a certain sub-net, while conversely denying access to those services when the mobile user is outside that area.

Moreover, it should be possible to ensure that certain services may be made available or not available when the Mobile Node moves (and the movement is tracked by the Mobile IP signalling). Specifically, the application should be in a position to check if the Care-of Address allotted to the Mobile Node at a certain time is entitled (or not entitled) to receive a specific service, with the requested Quality of Service and Security level. All this while properly controlling access to service and assuring seamless mobility to the Mobile Node.

Turning specifically to some of the prior art documents cited in the foregoing, the draft RFC <draft-kulkarni-mobileip-dynamic-assignment-02.txt>, discloses a messaging method for dynamic Home Agent assignment and for Home Agent redirection in a Mobile IP session.

In this messaging method, the Mobile Node can use the Network Access Identifier extension, i.e. the user domain, in order to be identified and for the assignment of the Home Address. The Mobile Node sends a request to the network in order to be dynamically assigned a Home Agent. This operation is performed by setting, in an initial Registration Request message, the Home Agent field to an IP address, equal to 0.0.0.0 or 255.255.255.255. If a Home Agent accepts the request a Registration Reply message is sent wherein the Home Agent field contains the Home Agent address. If the Home Agent refuses the request, the Registration Reply message is rejected. In this case, the Home Agent can suggest an alternative Home Agent, and the alternative Home Agent address is specified in the Home Agent field of the Registration Reply message.

<RFC 3344> describes the requirements for an IP Quality of Service mechanism for the operation with Mobile IP. This document essentially deals with forwarding the Mobile Node packet stream at the intermediate nodes in the network, so that the IP services sensitive to the Quality of Service can be supported over Mobile IP.

OBJECT AND SUMMARY OF THE INVENTION

The object of the present invention is thus to provide an improved arrangement adapted to achieve i.a. the following functions:

giving a user such as a Mobile Node the possibility of selecting more than one Home Agent, being thus allotted more than one Home Address, depending on the type of the service requested; a mobile user having more than one Home Address could be useful for the Mobile Node in order to be reached at different IP addresses by different groups of Services and/or Correspondent Nodes, giving a user the possibility of selecting a specific Home Agent (HA), e.g. when using an IPv4 or IPv6 mobility protocol, on the basis of the selected service required by the Mobile Node, while possibly taking into account other parameters, such as the QoS that the Mobile Node requires for that service.

overcoming the intrinsic limitations due to a Home Agent inability to filter packets on the basis of the requested service, and making Home Agent selection independent of the particular Home network associated with the Mobile Node.

According to the present invention, that object is achieved by means of a method having the features set forth in the claims that follow. The invention also relates to a corresponding system, a related network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

In a preferred embodiment of the invention, a mobile user can have several different Home Agents on the basis of the requested services. Furthermore, these services could be provided to the user either by the Home network or by a Foreign/Visited network where the user is currently located. Moreover, the Foreign network could be either in the same administrative domain in which the Mobile user has a subscription or in a roaming network.

BRIEF DESCRIPTION OF THE ANNEXED DRAWINGS

The invention will now be described, by way of example only, with reference to the enclosed figures of drawing, wherein.

DETAILED DESCRIPTION OF PREFERRED EMBODIMENTS OF THE INVENTION

By way of premise to this detailed description of an exemplary embodiment of the invention, some basic terminology repeatedly used in the following is briefly discussed here.

A "Home network" is a (possibly virtual) network having a network prefix matching the prefix of a Home Address assigned to a user (Mobile Node).

The Mobile Node has a subscription with an "owning network". This network is able to authenticate the Mobile Node, and is able to verify and change the Mobile Node subscription profile. When the Mobile Node is outside the Home network, the Mobile Node is in a "Visited (or Foreign) network". For "mobile" both mobility and "nomadic" use are intended.

Usually the owning network has a roaming agreement with the "roaming network".

Specifically, the arrangement described illustrates an arrangement for providing, to different Mobile Nodes using an extension of the Mobile IP protocol, access to services provided from one network (e.g. services provided by the owning network or by a roaming network). Additionally, the arrangement described applies the concept of Access Point Name, typical of mobile cellular networks, such as the GPRS/UMTS networks.

In order to access the desired service(s), the Mobile Node may behave in different ways depending on whether the Mobile Node uses the IPv4 or the IPv6 protocol.

Figure 1:
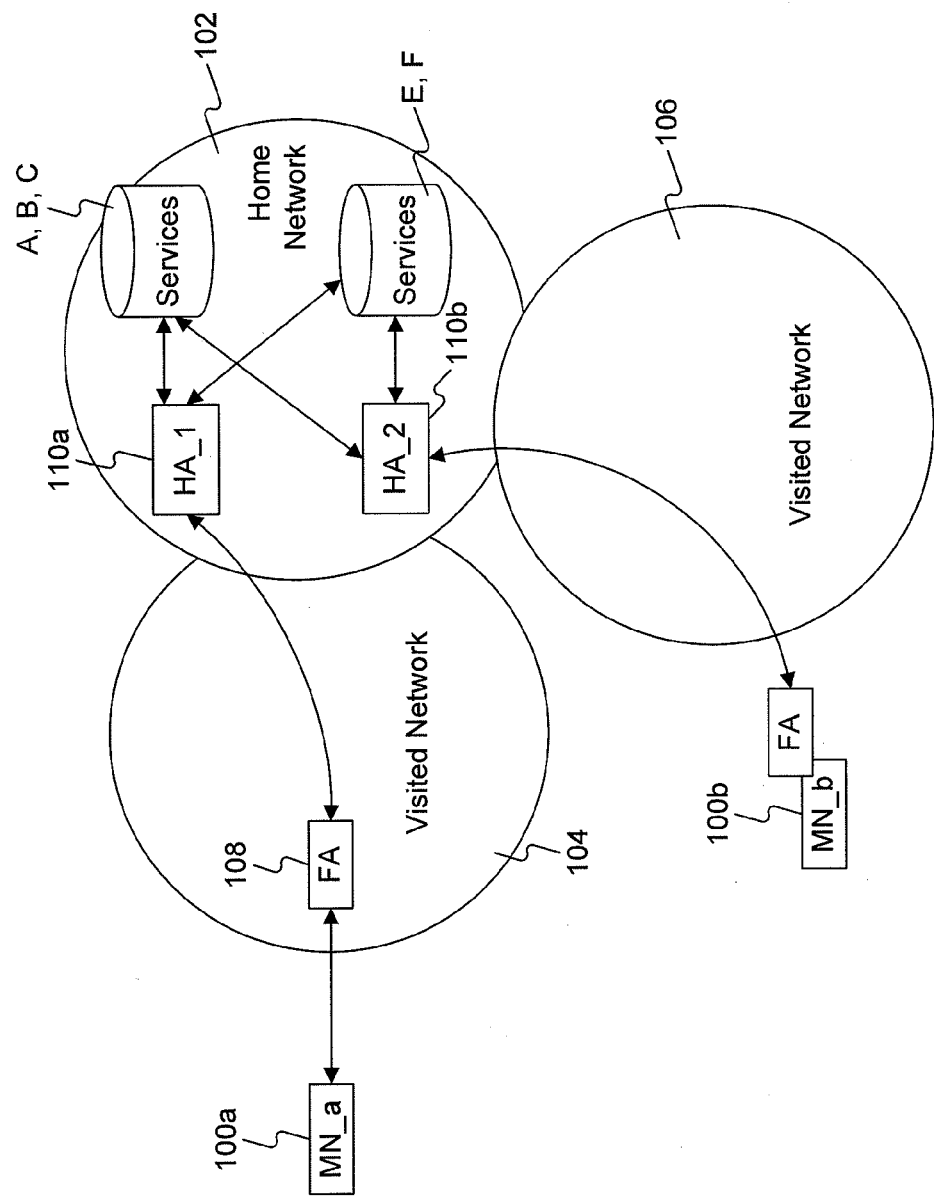
FIG. 1 depicts a typical scenario for Mobile IP registration used in the prior art methods.

FIG. 1 illustrates how Mobile IPv4 standard registration operates in the presence or absence of a Foreign Agent.

In the case of presence of the Foreign Agent 108 a Mobile Node 100a can be reached via a Foreign Agent Care-of Address. Conversely, in the case of absence of a Foreign Agent, a Mobile Node 100b can be reached via a Co-located Care-of Address.

Specifically, when the Mobile Node 100a is outside the Home network 102 (e.g. is in a Visited network 104), and a Foreign Agent 108 is present, the Mobile Node 100a activates the Mobile IP protocol.

According to this protocol, the Mobile Node 100a obtains a new Care-of Address in the Visited network 104 (although the Mobile Node 100a has a normal pre-configured Home Address). The Mobile Node 100a registers the new Care-of Address within the selected Foreign Agent 108 by sending a Mobile IPv4 "Registration Request" message. After that, the selected Foreign Agent 108 adds a line in a Binding Cache table to recall that the Mobile Node 100a (recognized via the Home Address) is reachable by the specified Care-of Address.

Then the Foreign Agent 108 sends a new Mobile IPv4 "Registration Request" message to the Home Agent 110a (which is located in the Home network 102) in order to communicate that the Mobile Node 100a has obtained that specific Care-of Address.

When receiving the message, the Home Agent 110a adds a line in a Binding Cache table to recall that the Mobile Node 100a is currently reachable at that specified Care-of Address, and send back to the Foreign Agent 108 a Mobile IPv4 "Registration Reply" message, which is also forwarded to the Mobile Node 100a. This procedure is repeated every time the Mobile Node 100a acquires a new Care-of Address. From now onwards, data packets that arrive at the Home network 102 of the Mobile Node 100a, are encapsulated by the Home Agent 100a in messages sent to the Care-of Address of the Mobile Node 100a.

In particular, in FIG. 1 the Home Agent 110a provides services A, B, and C, while the Home Agent 110b provides services E and F.

A basic difference with respect to the case where the Foreign Agent is absent, lies in that the Mobile Node registers directly with the Home Agent and data packets are sent (tunneled) from the Home Agent to the Mobile Node Care-of Address that is co-located with the Mobile Node.

FIG. 1 also illustrates the case where data packets to and from Mobile Nodes (both 100a and 100b) are sent using the Mobile IP reverse tunnel option. According to that option, packets from the Mobile Nodes, 100a or 100b, are sent back (tunneled) to their respective Home Agents, 110a or 110b, that decapsulate the packets and forward them to the correct destinations.

The result of this procedure is that the Mobile Node can access all the services (without any distinction) from the Home Agent with which the Mobile Node is registered. Moreover, the Mobile Node is registered with one and only one Home Agent each time.

Figure 2:
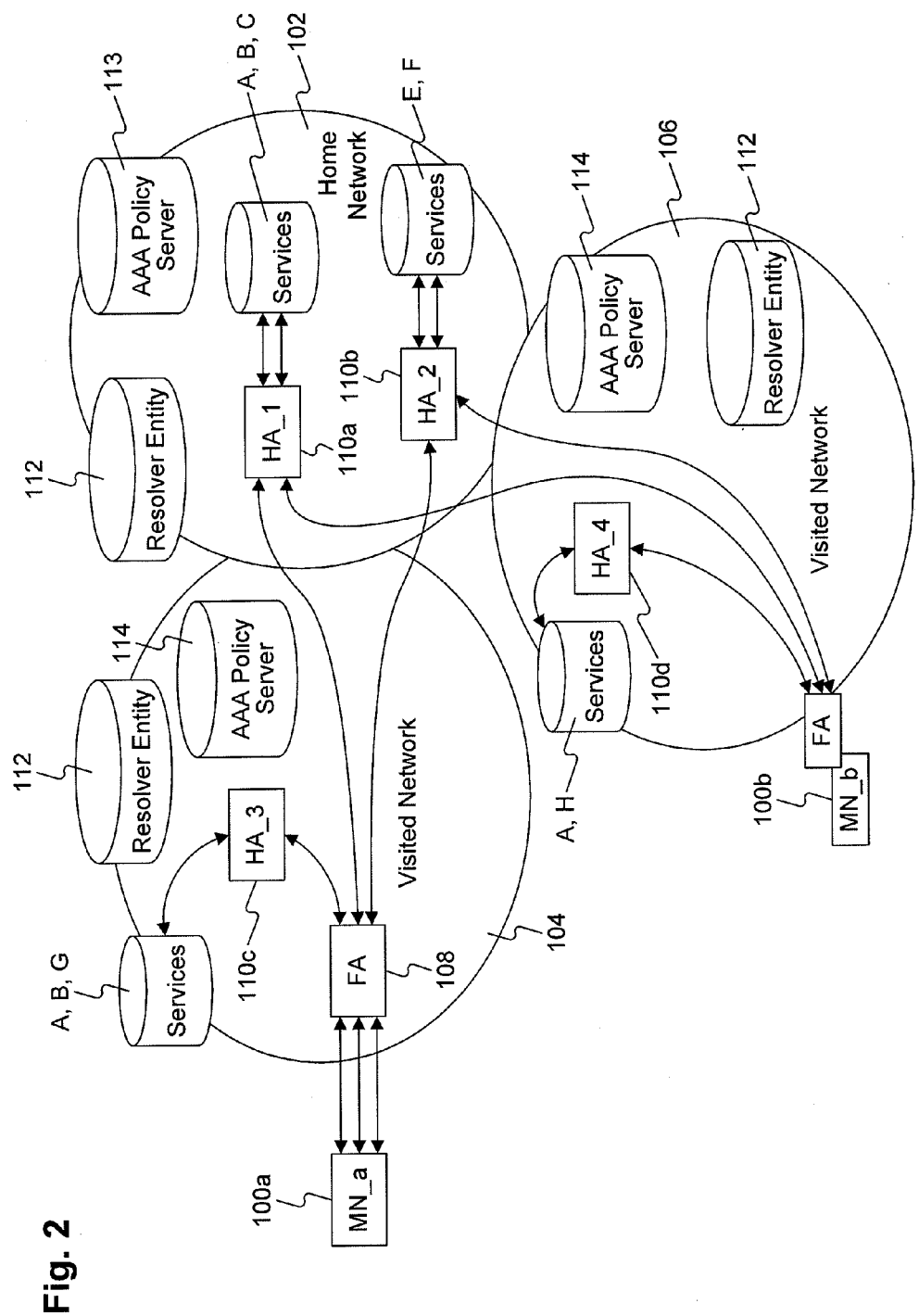
FIG. 2 is an exemplary comparative representation of similar functions as performed in the arrangement described herein in the case of Co-located Care-of Address and/or Foreign Agent Care-of Address usage.

FIG. 2, which depicts the general approach underlying the arrangement described herein, considers, as an example, the case of Mobile IP for the IPv4 protocol.

In FIG. 2 both the cases, with and without Foreign Agents, are shown.

In Mobile IPv6 the only operational mode possible is the Co-located Care-of Address that regards the case of absence of the Foreign Agent.

In the case where Foreign Agents are present the Mobile Node 100a listens to the Mobile Router Advertisement provided by the Foreign Agents (as in normal Mobile IPv4 protocol). Then the Mobile Node 100a selects one of the Foreign Agents and sends a Mobile IPv4 Signalling message to the selected Foreign Agent 108 (as in the standard Mobile IPv4 protocol).

In particular, in FIG. 2 the Home Agent 110a provides services A, B, and C, the Home Agent 110b provides services E and F, the Home Agent 110c provides services A, B and G, and the Home Agent 110d provides services A and H.

The Mobile Node has no assigned Home Agent, which implies that it does not have any assigned Home Address or may have a different Home Address, which is not valid (e.g. it has a different network prefix) for accessing that particular Home network.

Thus, the Mobile Node cannot identify himself (with the owning network) by means of the Home Address.

In comparison with the arrangement previously considered, the user identity is not the basic element for the Home Agent selection. However this information is associated with the service request, as described in the following, for the purpose of checking of user service subscription, and for charging and billing purposes.

Consequently the Mobile Node can be identified by the Network Access Identifier or by other information items.

In the embodiment described herein the user is identified by the owning network by using an identity not in the format of a Network Access Identifier (which for example could be derived from the Third Generation Partnership Project (3GPP) International Mobile Subscriber Identity, or a Certificate).

Specifically, the selection of the Home Agent is based on a "per-service" criterion, by introducing a Service Identifier that identifies one or more services requested by the Mobile Node.

Furthermore, the Signalling message for the first Mobile IP registration is extended with an additional identification of the service the Mobile Node wishes to access.

This additional Service Identifier can be in the form of an alphanumeric string, which may appear in a human readable form (i.e. an http url, or a SIP url, etc.), and could be inserted, for example, in the field of the Mobile IP Registration message reserved to the Home Agent address or in an "ad-hoc" field.

When an additional field is present in the Mobile IP Registration message, then another field (i.e. a bit field) is present in this message, that indicates the presence of this service indication field.

This service indication field is taken into account in the place of the Home Agent address field.

The Service Identifier is resolved (locally with respect to the Mobile Node position, which is known through the Care-of Address) by the Foreign Agent (or by a Resolver Entity, which could be a Domain Name Server, indicated 112 in FIG. 2, or an enforcement entity, etc.). This by optionally checking, e.g. via servers, if the user is authenticated/authorized to access the requested service (this check can be effected by using servers located in the owning and/or in the roaming network).

The Service Identifier resolution function can be operated also by considering other parameters that could be optionally expressed by the mobile user and included in other extensions of the Registration Request. Exemplary of these are e.g. the Quality of Service (QoS) level, the Security Protocols used for data encryption, the Authentication procedures etc.

The service identification resolution function leads to a valid IP address of a Home Agent that controls the access to the requested service and that fulfils the specified parameters (more than one Home Agent could access that particular service, by fulfilling the optional service attributes requested, and in this case the Foreign Agent or the Resolver could implement a load balance).

After this resolution function, the Foreign Agent forwards the Mobile IP Registration Message to the selected (resolved) Home Agent. Optionally, after the authentication/authorization verification with a Visited "Authentication, Authorization, and Accounting" (AAA) Policy server, indicated 114 in FIG. 2, and/or a Service Policy server (that could be located in the owning and/or in the roaming network) the Mobile Node 100a is entitled to access that particular service. In FIG. 2 the Home "Authentication, Authorization, and Accounting" (AAA) Policy server is indicated 113. The selected Home Agent 110a replies the Foreign Agent 108 with a message of "Registration Reply" directed to the Mobile Node 100a.

In case of a positive updating, this "Reply Message" carries both the Home Address assigned to the Mobile Node for accessing that particular service(s) and also the Address of the Home Agent that has been selected for that service with the requested parameters. In case of multiple Home Agent registration (according to the services that the Mobile Node is accessing), the Mobile Node may obtain a number of Home Addresses equal to the number of the Home Agents with which the Mobile Node is registered.

The Home Agent could also optionally decide not to use that particular Foreign Agent for providing the Mobile Node with the service requested. Then the Home Agent could send a negative "Registration Reply" message to the Foreign Agent, indicating the causes of the failure and optionally the address of the Foreign Agent to be used for accessing that service.

After reception, this negative "Registration Reply" message is forwarded by the Foreign Agent to the Mobile Node that restarts the Registration process using the suggested address for the Foreign Agent. This is in fact a "Foreign Agent redirection" which could be used e.g. when some particular services in the owning or in the roaming network can be provided only through some particular Foreign Agent that are able to support the Mobile Node requested service.

In case of Co-located Foreign Agent, i.e. when the Mobile Node acts as a Foreign Agent itself, the above procedure is still valid. The actions previously performed by the Foreign Agent are now performed directly by the Mobile Node 100b.

Figure 3:
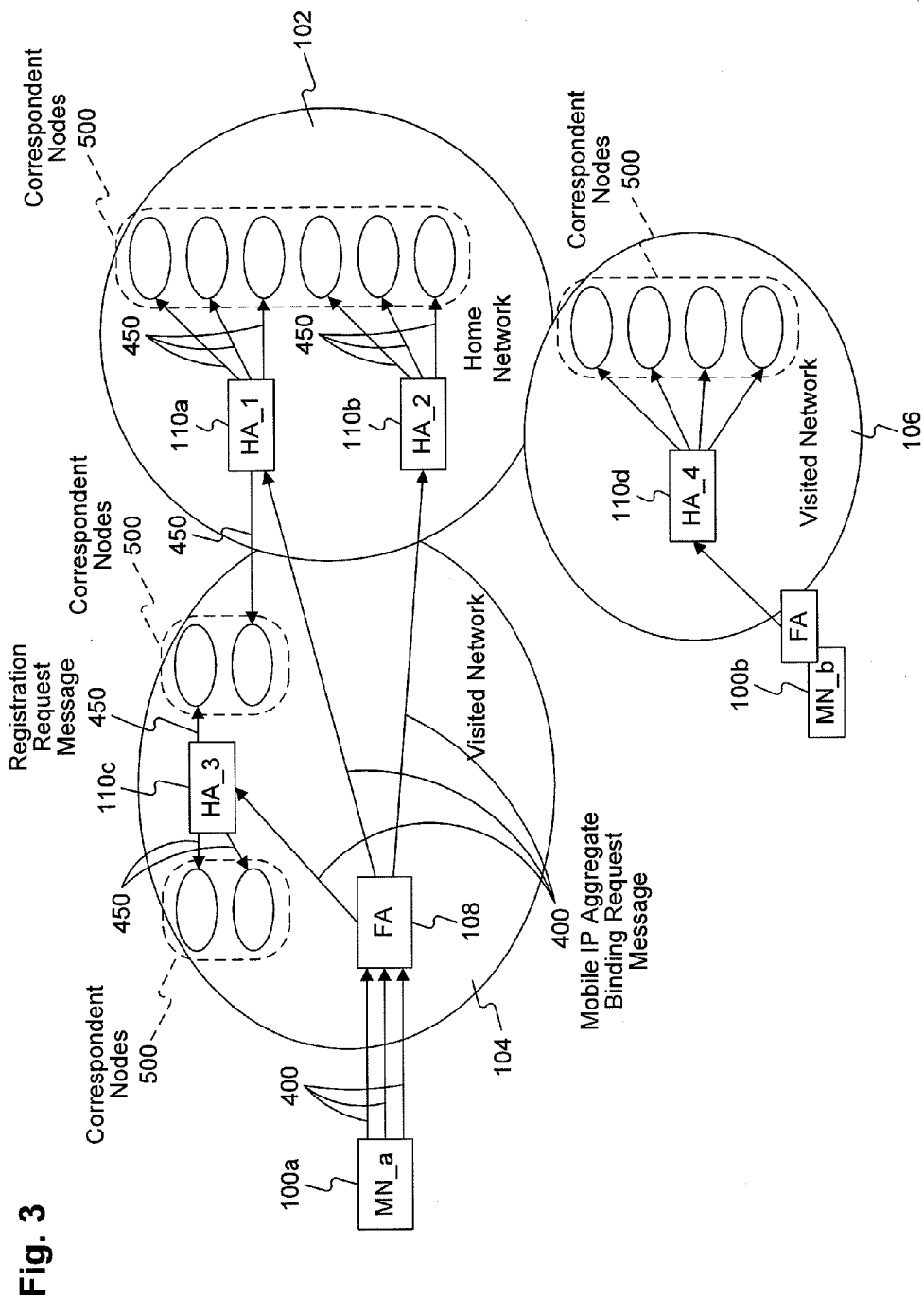
FIG. 3 shows a case in which a Mobile Node sends plural "Mobile IPv4 Aggregate Registration Request" messages (or many "Mobile IPv6 Aggregate Binding Update" messages) each directed to a specific Home Agent.
Figure 4:
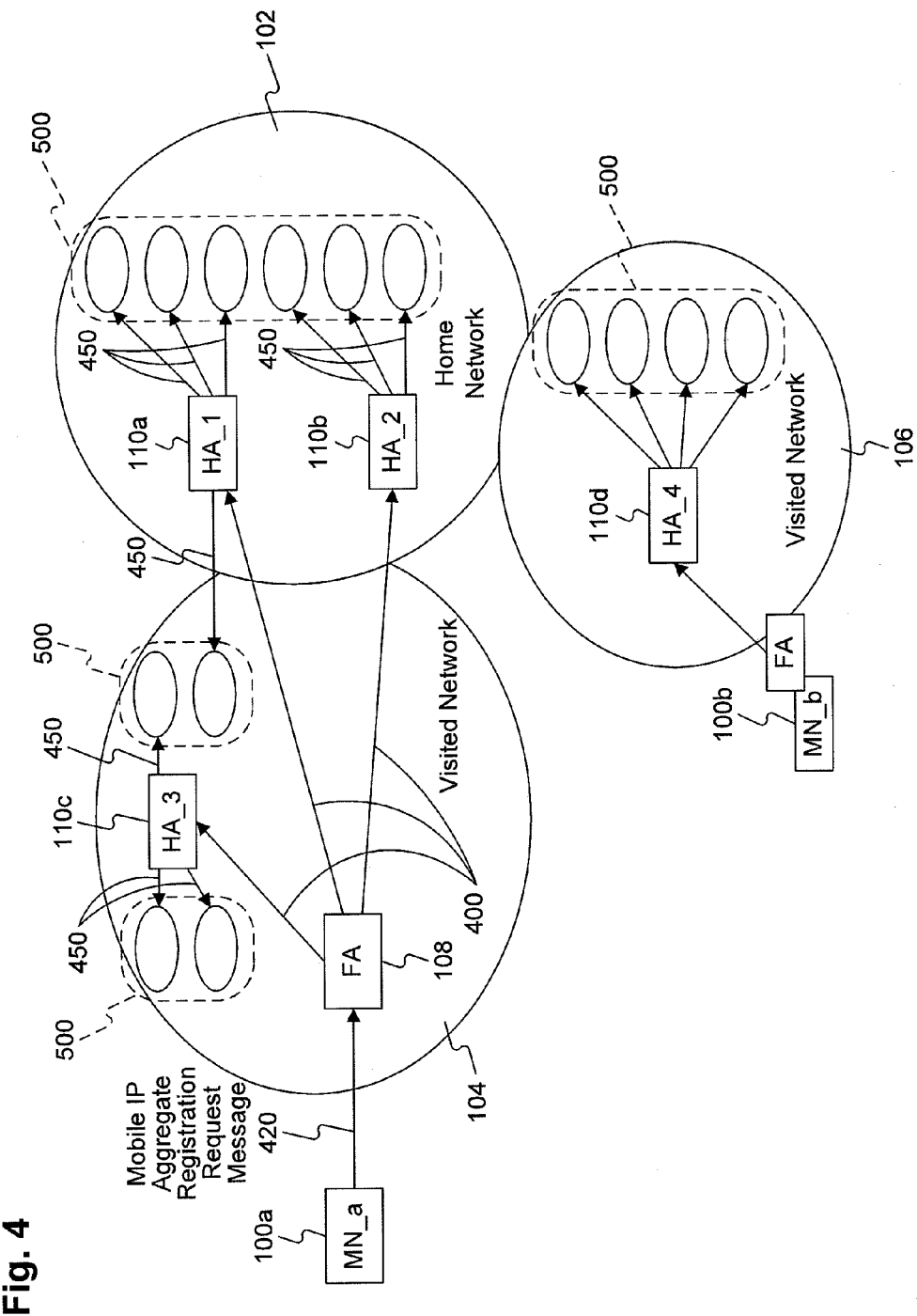
FIG. 4 shows a case in which the Mobile Node sends only one "Mobile IPv4 Aggregate Registration Request" message (or one "Mobile IPv6 Aggregate Binding Update" message) carrying the list of the Home Agents and the relative Correspondent Nodes addresses to be updated.

While referring to a subsequent section of this description (related to FIG. 9 and the following figures) for further detail, FIGS. 3 and 4 refer to the case where the Mobile Node 100a wants to start a communication with one or several Correspondent Nodes indicated 500. In that respect, the Mobile Node 100a could optionally inform the Correspondent Node(s) about one particular Home Address associated with a certain Home Agent, using a new message called "Mobile IPv4 Aggregate Registration Request message" 400 or Mobile IPv6 Aggregate Binding Update message. These indicate the list of the Correspondent Nodes in respect of which the Mobile Node 100a wants to learn the Home Address assigned by that Home Agent. This new message solves more efficiently (in terms of bandwidth waste) the well-known problem of "triangular routing" in case of Mobile Node bindings related to more than one Home Agent.

This new "Mobile IPv4 Aggregate Registration Request message" 400 (or Mobile-IPv6 Aggregate Binding Update message) is a message that follows the first Mobile IPv4 "Registration Request" message (or the Mobile IPv6 Binding Update message) that selects the service(s) and assign the Home Address(es) to the Mobile Node. This is an optional message since the Mobile Node is free to inform or not to inform certain Correspondent Node(s) about one or more of its Home Address(es) in order to be reachable.

Once the "Mobile IPv4 Aggregate Registration Request message" 400 (or Mobile IPv6 Aggregate Binding Update message) arrives at the selected Home Agent, the Home Agent itself generates the Mobile IPv4 "Registration Request" messages 450 (or the Mobile IPv6 Binding Update messages) directed to the one or more Correspondent Nodes 500, depending on the list available in the "Mobile IPv4 Aggregate Registration Request message" (or Mobile IPv6 Aggregate Binding Update message) that the Mobile Node has previously sent to that selected Home Agent. The Correspondent Nodes could be in the same network of the Home Agent or also in different networks (as shown in FIG. 3 or FIG. 4).

The list of Correspondent Nodes carried by the "Mobile IPv4 Aggregate Registration Request message" 400 (or by the Mobile IPv6 Aggregate Binding Update message) is created, for example, based on a Security and/or Quality of Service level requested by the communication between the Mobile Node and certain Correspondent Nodes.

The Mobile IP (v4 and v6) signalling messages are modified in order to carry this list of Correspondent Nodes where the Mobile Node binding has to be updated by that specific Home Address.

When a Foreign Agent is present (in a Mobile IPv4 protocol), two cases are possible:

CASE 1 (shown in FIG. 3): the Mobile Node 100a can directly send to the Foreign Agent 108 several "Mobile IPv4 Aggregate Registration Request messages" 400. These are directed at all the Home Agents selected, and each message carries only the list of Correspondent Nodes that must be informed of the Home Address associated to that particular Home Agent. In this case, the Foreign Agent 108 only forwards these "Mobile IPv4 Aggregate Registration Request messages" 400 to the selected Home Agents.

CASE 2 (shown in FIG. 4): the "Mobile IPv4 Aggregate Registration Request message" 420 sent by the Mobile Node 100a to the Foreign Agent 108 may carry the list of Home Agents to be reached. For each Home Agent a list of Correspondent Nodes has to be informed about the Home Address corresponding to that Mobile Node Home Address. In this case, the Foreign Agent 108 receives the "Mobile IPv4 Aggregate Registration Request message" 420, and generates different "Mobile IPv4 Aggregate Registration Request messages" 400 for each Home Agent indicated in the received messages. Each of these carries only the list of the Correspondent Nodes that have to be informed of the Home Address assigned by that particular Home Agent. Each receiving Home Agent generates normal Mobile IPv4 "Registration Request" messages 450 directed to the list of Correspondent Nodes.

On the other hand, when a Foreign Agent is not present (both in Mobile IPv4 and in Mobile IPv6 protocols), the Mobile Node 100b directly sends a "Mobile IPv4 Aggregate Registration Request message" (or a Mobile IPv6 Aggregate Binding Update message) to all the selected Home Agents. Each message carries only the list of Correspondent Nodes that must be informed of the Home Address associated to that particular Home Agent.

This procedure has the additional advantage of saving bandwidth on the radio interface, since only a limited number M (equal to the number of Home Agents where that Mobile Node has a binding) of Mobile IPv4 Registration Request messages (or the Mobile IPv6 Binding Update messages) have to be sent by the Mobile Node to the Home Agent(s) in order to update the bindings in all the Correspondent Nodes (said N) with which the Mobile Node is communicating ($1 \leq M \leq N$).

Figure 5:
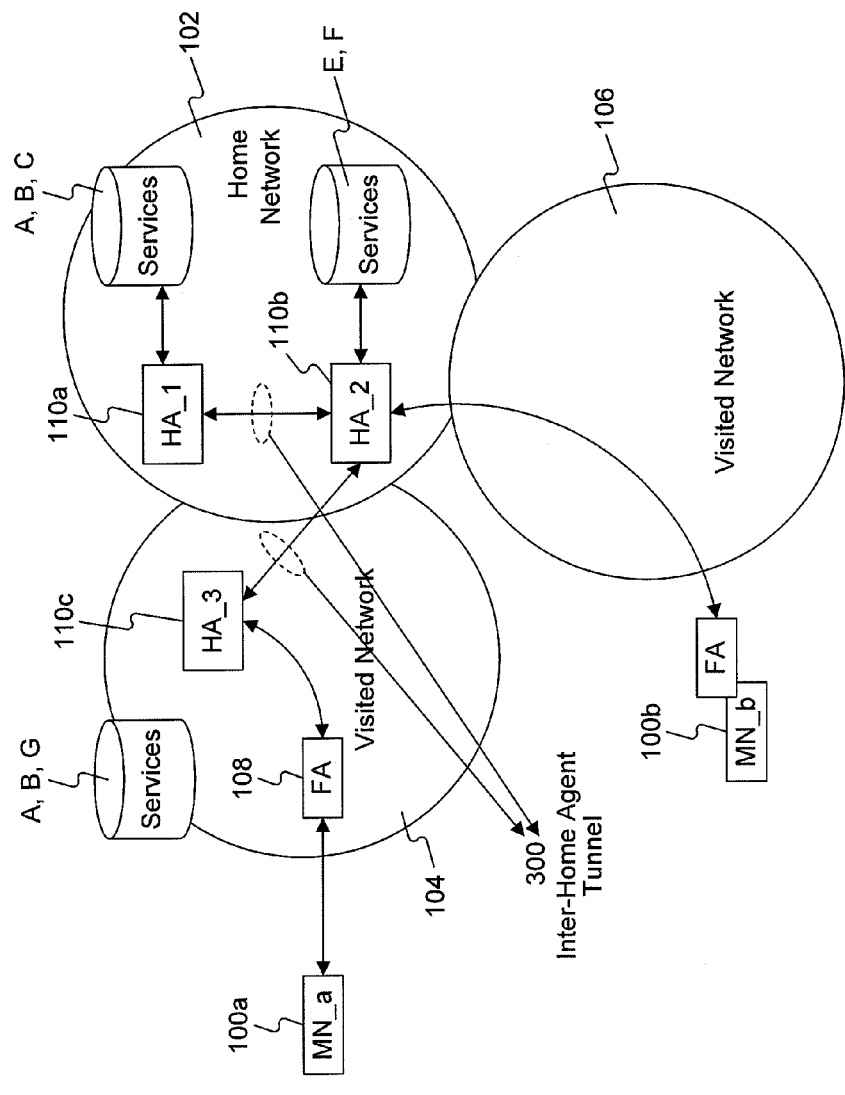
FIG. 5 depicts a typical configuration of the arrangement described herein in the case of Proxy Home Agent usage.

FIG. 5 shows the case where the Home Agent, HA_2, 110b, is acting as a "Requesting Home Agent" for the Mobile Node, MN_b, 100b, for providing services A, B, and/or C. This while the Home Agent HA_3, 110c, is acting as a "Requesting Home Agent" for the Mobile Node MN_a, 100a, for providing services E and/or F. The last case shows the "Requesting Home Agent" forwarding packets also from a Foreign network (possibly also a roaming network) to a Home network.

Figure 6:
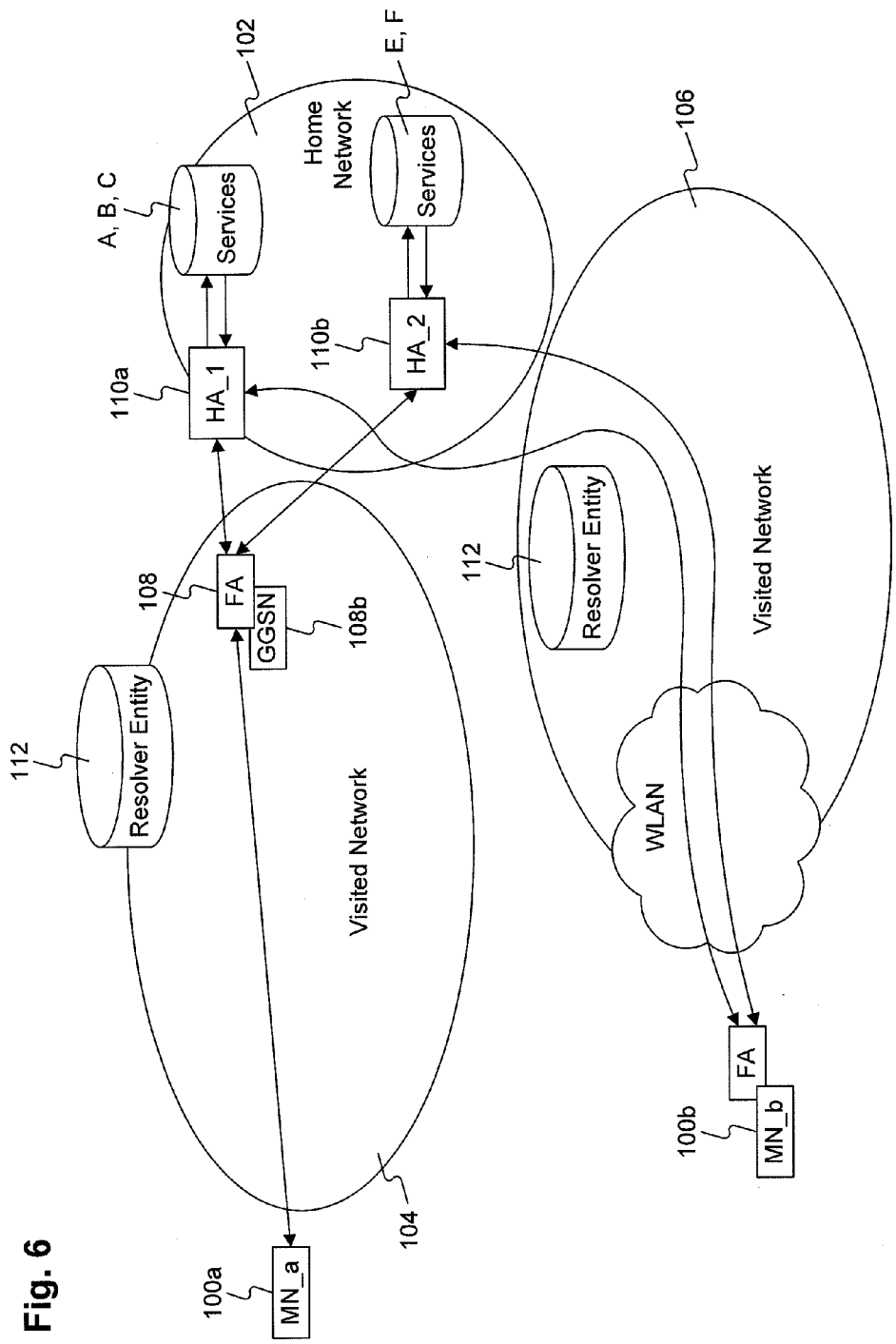
FIG. 6 illustrates the a typical network configuration of the arrangement described herein in the case of GPRS/WLAN network using the IPv4 protocol, and in particular, the option of Co-located Care-of Address for the Mobile Node accessing to the services from the GPRS/UMTS, and Foreign Agent Care-of Address for the Mobile Node accessing to the services from the WLAN.

FIG. 6 shows the case of a GPRS/UMTS network (Visited network 1, indicated 104) and an associated WLAN with the relative core network as Foreign Network (Visited network 2, indicated 106). In the first Visited network, 104, the Foreign Agent is for example Co-located with the Gateway GPRS Serving Node (GGSN), 108b while in the second Visited network, 106, the Foreign Agent is co-located with the Mobile Node MN_b, 100b.

Figure 7:
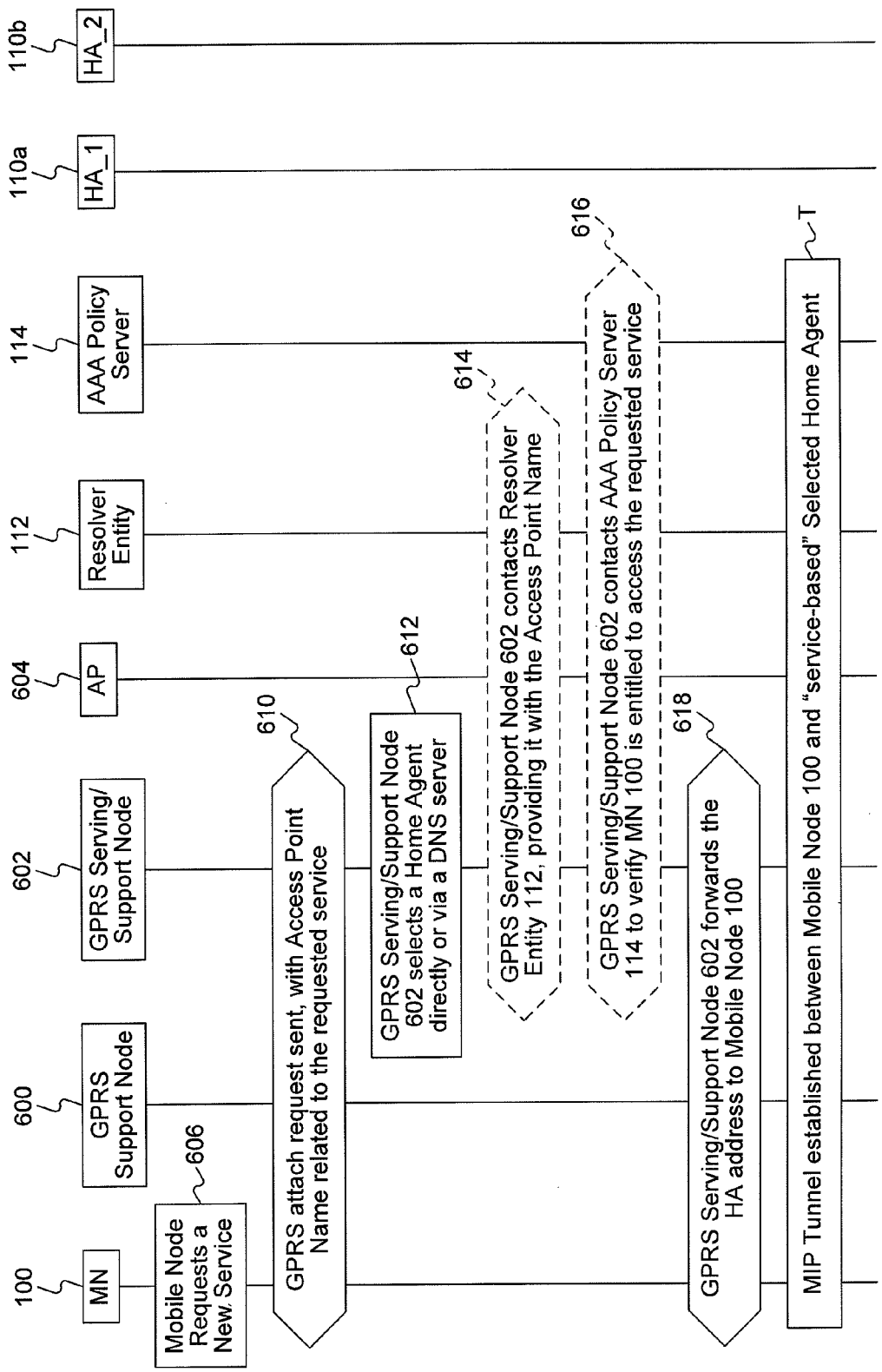
FIG. 7 shows an example of messages exchange for service-based Home Agent selection and a Mobile IP registration in case of access from a GPRS/UMTS network.
Figure 8:
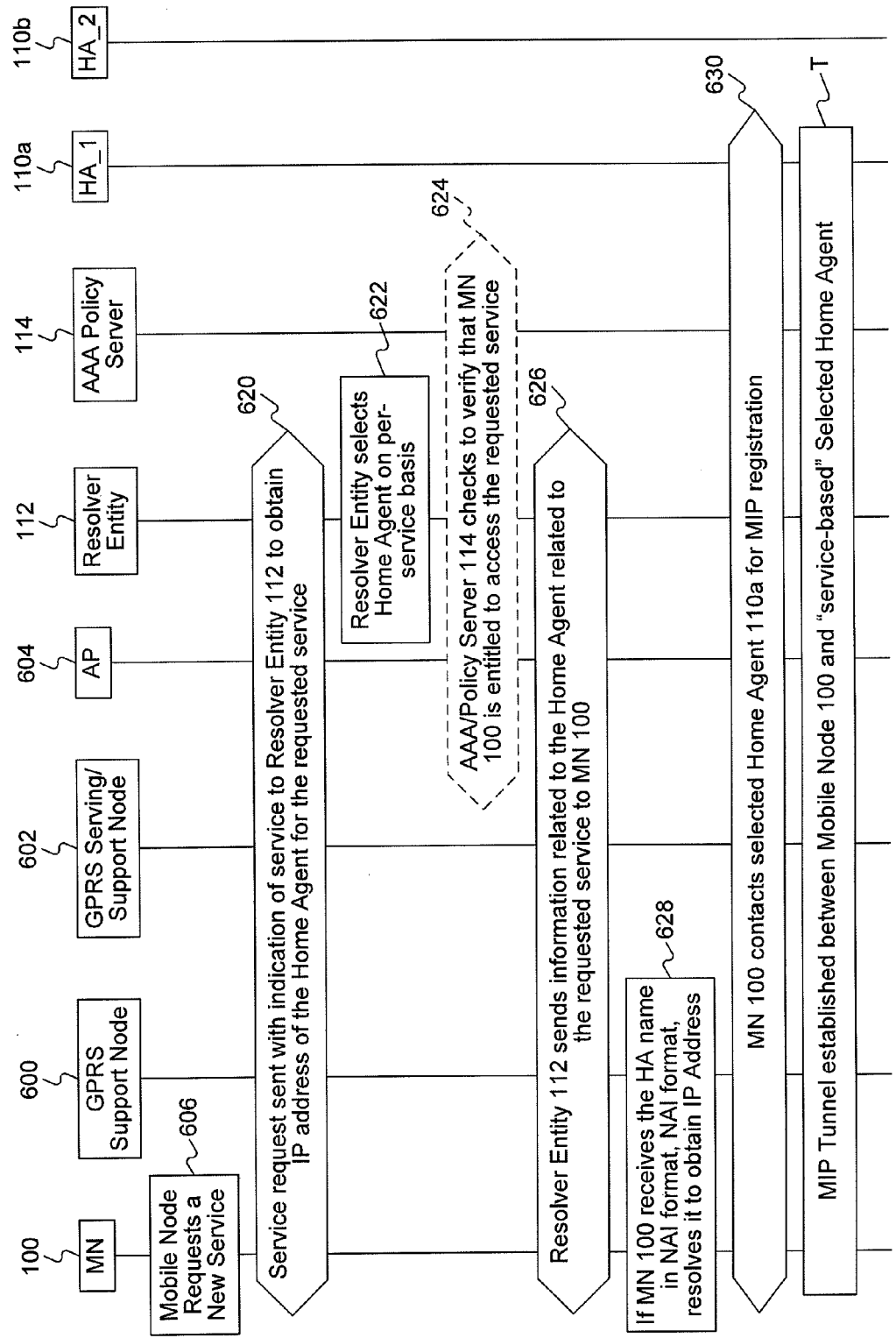
FIG. 8 illustrates an example of messages exchange for service-based Home Agent selection and a Mobile IP registration in case of access from a WLAN network.

FIG. 7 and FIG. 8 show two examples of signalling message exchanged for selecting a service-based Home Agent and for installing a Mobile IP tunnel for accessing to the service itself are shown.

In FIG. 7, in a step 606 a Mobile Node 100 requests a new service. As a consequence, in a step 610 a GPRS attach request is sent with the Access Point Name related to the Requested service. This service is negotiated with the Serving GPRS Support Node, 600 and with the Gateway GPRS Serving/Support Node 602. In a step 612 the Gateway GPRS Serving/Support Node 602 selects on Access Point Name basis the Home Agent directly or via a Domain Name Server (DNS) server. The Gateway GPRS Serving/Support Node 602 contacts in a step 614 the Resolver 112 providing it with the Access Point Name. The Gateway GPRS Serving/Support Node 602 also contacts in a step 616 the AAA/Policy server 114 in Home/Visited network to verify that the Mobile Node 100 is entitled to access that service. In a step 618 the Gateway GPRS Serving/Support Node 602 forwards the Home Agent address to the Mobile Node 100 in the Packet Data Protocol (PDP) Context activation response.

In this case, a MIP tunnel T for the selected service is established between the Mobile Node 100 and the "service-based" selected Home Agent in case of access from GPRS/UMTS network.

In FIG. 8 a Mobile Node 100 requests, in a step again indicated 606, a new service. As a consequence, in a step 620 a service request is sent with an indication of the service (e.g. an Access Point Name) to a Resolver entity 112 (e.g. a Domain Name Server) in order to obtain the IP address of the Home Agent for the requested service. In a step 622 the Resolver entity 112 selects the Home Agent on a per-service basis. In a step 624, the AAA/Policy server 114 checks in Home/Visited network to verify that the Mobile Node 100 is entitled to access that service. In a step 626, the Resolver 112 sends the information related to the Home Agent related to the requested service to the Mobile Node 100. The answer can be the IP address of the Home Agent or the name of the Home Agent in NAI format. In a step 628 if the Mobile Node 100 gets the name of the Home Agent in a NAI format, resolves it to obtain the IP address. At this point the Mobile Node 100 contacts the selected Home Agent 110a for MIP registration.

In this case, a MIP tunnel T is established for the selected service between the Mobile Node 100 and the "service-based" selected Home Agent in case of access from WLAN network.

Figure 9:
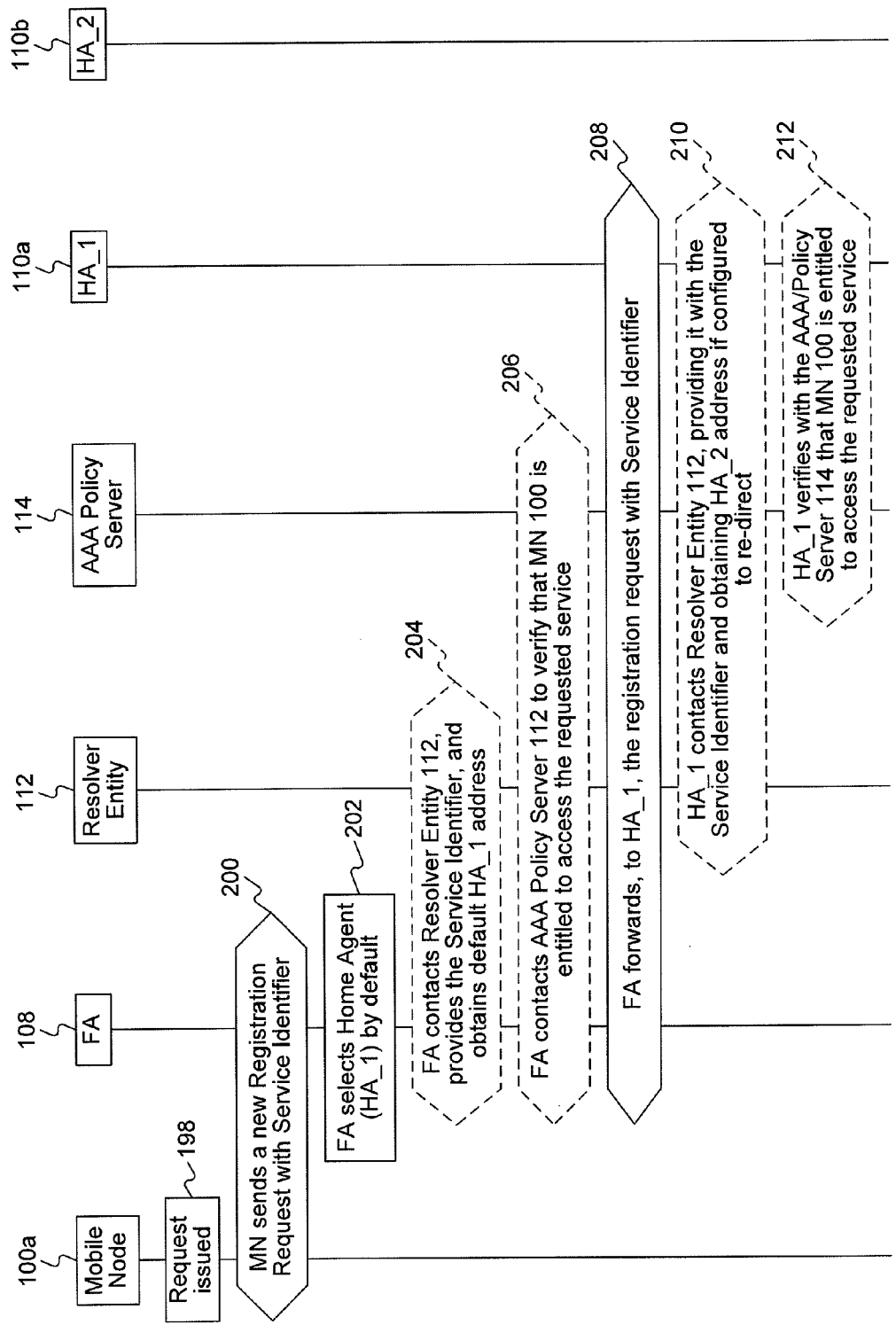
FIG. 9 illustrates a preliminary message exchange in case the selected Home Agent is incorrect.

FIG. 9 presents a preliminary message exchange, between the Mobile Node 100a and the Home Agent 110a, in the case of incorrect selection of the Home Agent.

If the Mobile Node 100a wants to access a service different from the one currently received, a corresponding request is issued in a step 198. As a consequence, in a step 200 the Mobile Node 100a sends a new Mobile IPv4 "Registration Request" message to the Foreign Agent 108 for that service, carrying the Service Identifier. When the Mobile IPv4 "Registration Request" message arrives at the Foreign Agent 108 this may include a binding between the Mobile Node Care-of Address and a Home Agent address for that particular service that the Mobile Node is trying to access.

Conversely, in a step 202, thanks to a policy obtained by the owning network (or by the roaming network or optionally received from the Resolver 112), the network can be configured in order to assign a default Home Agent (HA_1, indicated 110a, that could be the "default Home Agent" for that particular Mobile Node or the Home Agent with which the Mobile Node is registered for accessing the previous service) to that particular Mobile Node 100a.

In steps 204, 206, and 208, if this binding is present, the Foreign Agent 108 (or the Resolver 112) may decide not to resolve the Service Identifier (optionally asking to the Resolver 112). This is in the Mobile IPv4 "Registration Request" message in a new Home Agent address, but could forward the Mobile IPv4 "Registration Request" message to the Home Agent which already is used by the Mobile Node 100a for accessing the service previously requested (or a default Home Agent for that particular Mobile Node). Optionally, the possibility also exists of verifying with the AAA/Policy server, 114, in owning/roaming network, if that Mobile Node 100a is entitled to access to the requested service.

In a step 210, the Home Agent, HA_1, indicated 110a, that receives the forwarded Mobile IPv4 "Registration Request" message can optionally contact the Resolver 112, providing it with the Service Identifier and obtaining the address of a different Home Agent, HA_2, indicated 110b, if the first reached Home Agent 110a is configured to redirect Mobile Node 100a to a different Home Agent, 110b, for some reasons (HA_1 110a redirects requests to HA_2 110b). At this point, in a step 212, the Home Agent, HA_1, 110a, (that behaves as a Requesting Home Agent) can optionally verify with the AAA/Policy server 114 in the owning/roaming network if that Mobile Node 100a is entitled to access to the requested service.

This means that the Home Agent 110a receiving the Mobile IPv4 "Registration Request" message from the Foreign Agent, the so-called "Requesting Home Agent" is in charge of resolving the Service Identifier (eventually using the Resolver 112) and finding the correct Home Agent, 110b, the so-called "Service Access Home Agent", from which the Mobile Node receives the requested service.

At this point the "Requesting Home Agent" behaves in different ways.

Figure 10:
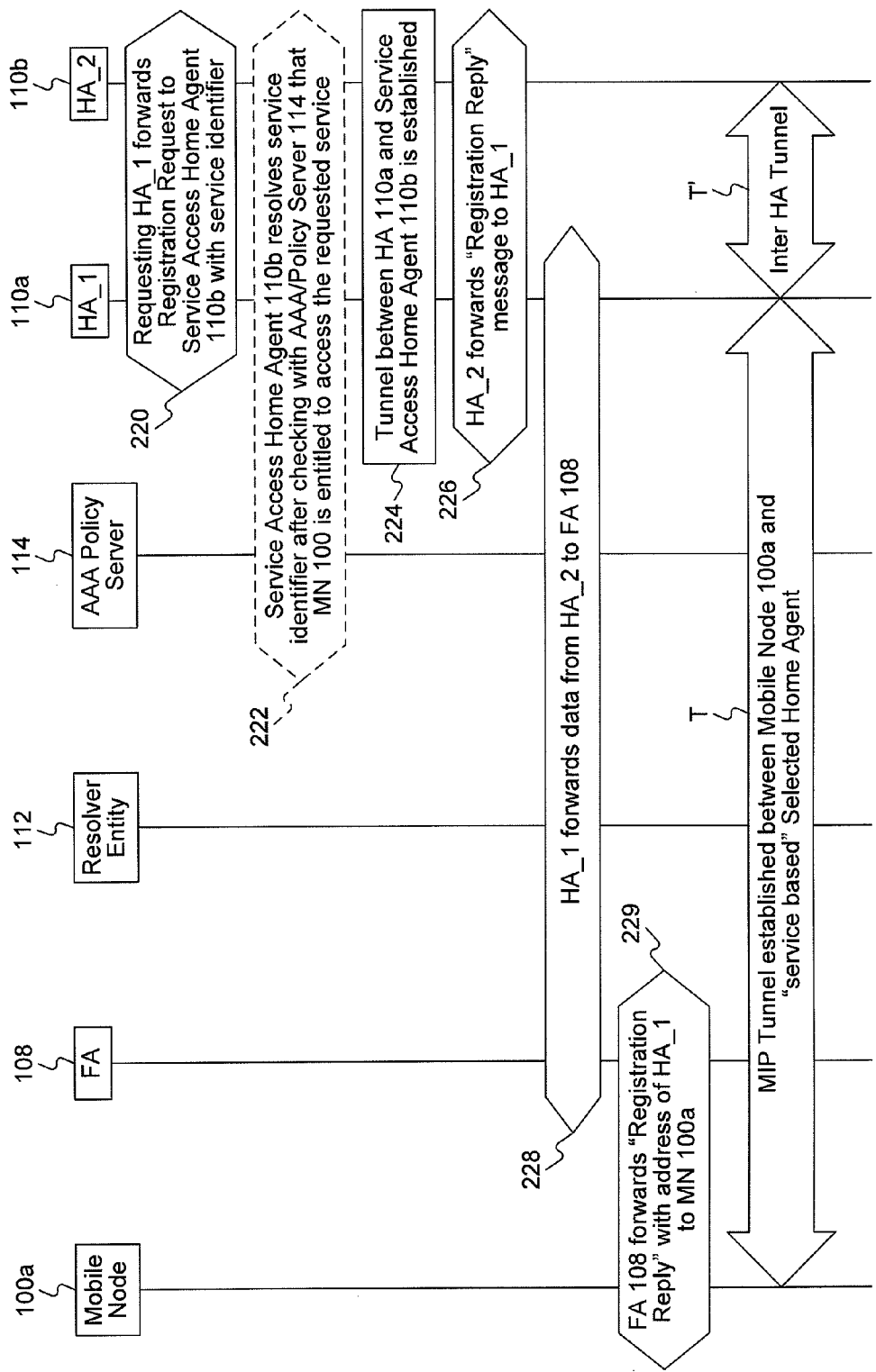
FIG. 10 shows a scenario of so-called "Anchor Home Agent" usage.

In FIG. 10, in a step 220, the "Requesting Home Agent", 110a, can forward the Mobile IPv4 "Registration Request" message to the "Service Access Home Agent" 110b. In a step 222, the "Service Access Home Agent", 110b can resolve the Service Identifier (optionally after a verification operation with the AAA/Policy server, 114, in the owning/roaming network if that Mobile Node 100a is entitled to access to the requested service) and send, in a step 226, the Mobile IPv4 "Registration Reply" message. This occurs via the "Requesting Home Agent", by assigning to the Mobile Node the opportune Home Address. In that case, the "Requesting Home Agent" 110a acts as a proxy for the Mobile Node data, as it receives the data coming from the "Service Access Home Agent" and it forwards them to the Mobile Node Foreign Agent 108, in a step 228. In a step 224, a (static or dynamic) tunnel between the "Requesting Home Agent" 110a and the "Service Access Home Agent" 110b is established. This case has the advantage that, when the Mobile Node changes its Care-of Address, the Mobile Node 100a has to inform (irrespective of how many services it is accessing) only one Home Agent, i.e. the "Requesting Home Agent" 110a. Moreover, the "Requesting Home Agent", 110a, communicates to the "Service Access Home Agent", 110b, to forward the Mobile Node data to it, so that the "Service Access Home Agent" lob has a Binding table made by three entries: Mobile Node Home Address, Mobile Node Care-of Address and Mobile Node "Requesting Home Agent". In this case, the "Requesting Home Agent" 110a behaves like an "Anchor Home Agent" for all services that are accessed by the Mobile Node 100a. The main advantage of this solution lies in that, when the Mobile Node acquires a different Care-of Address, the Mobile Node 100a always sends only one Mobile IP Signalling message (Mobile IPv4 or Mobile IPv6) to the Anchor Home Agent for updating its position. This irrespective of how many services the Mobile Node 100a is accessing. The Anchor Home Agent itself forwards the Mobile IP Signalling message to each "Service Access Home Agent" from which the Mobile Node is currently receiving services.

Reference numeral 229 designates a step where the Foreign Agent 108 forwards to the mobile node 100a the Mobile IPv4 Registration Reply with the address of the Home Agent HA_1 as the current Home Agent.

In this case, a MIP tunnel T for the selected service is established between the Mobile Node 100a and the Home Agent HA_1, 110a. Additionally an Inter Home Agent tunnel T' is established between the "Anchor Home Agent" 110a and the "Service Access Home Agent" 110b.

Figure 11:
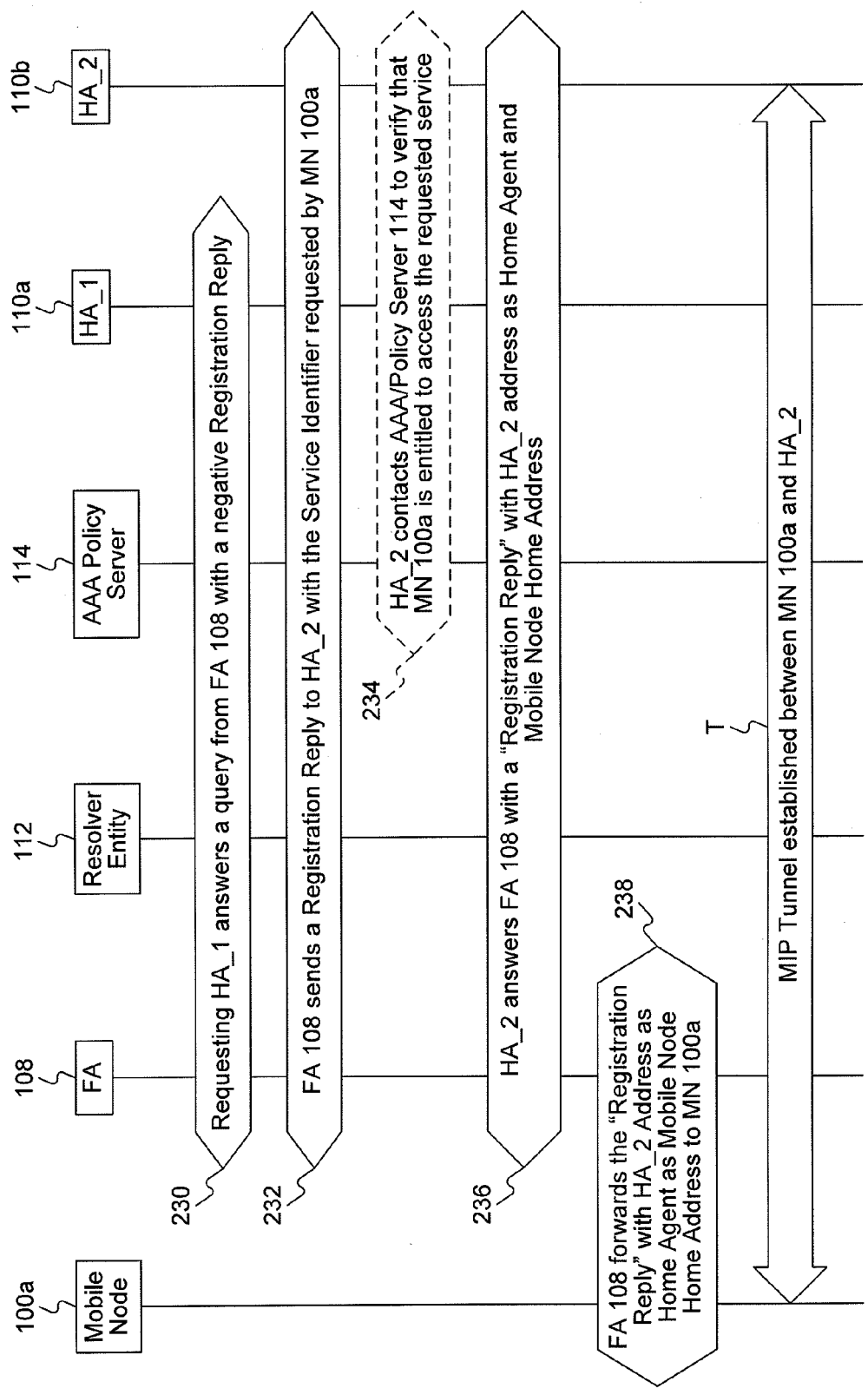
FIG. 11 shows a scenario of so-called "Redirecting Home Agent" usage that redirects the signaling messages to a new Home Agent.

FIG. 11 shows the "Requesting Home Agent" 110a answering, in a step 230, a query from the Foreign Agent 108 with a negative Mobile IPv4 "Registration Reply". This message is intended to inform (with appropriate failure causes) that the Home Agent address has been resolved in a wrong way. In case of negative updating, the Mobile IPv4 "Registration Reply" message sent by the Home Agent 110a to the Foreign Agent 108 could also carry the address of a new Home Agent, 110b, available to provide the requested service. This is a typical "Home Agent redirection" action as used for example for service load balancing. In a step 232 the Foreign Agent 108 sends a Mobile IP "Registration Reply" to the Home Agent HA_2, 110b, with the Service Identifier requested by the Mobile Node 100a. In a step 234 the Home Agent HA_2, 110b, contacts the AAA/Policy sever, 114, in owning/roaming network to verify that the Mobile Node 100a is entitled to access that service. In a step 236 the Home Agent HA_2, 110b, answers to the Foreign Agent, 108, with a Mobile IP "Registration Reply" with the Home Agent HA_2 address as Home Agent and Mobile Node Home Address.

In a step 238 the Foreign Agent, 108, forwards to the Mobile Node 100a the Mobile IP "Registration Reply" with the Home Agent HA_2 address as Home Agent and Mobile Node Home Address.

In this case, a MIP tunnel T is established for the selected service between the Mobile Node 100a and the Home Agent HA_2, 110b.

Figure 12:
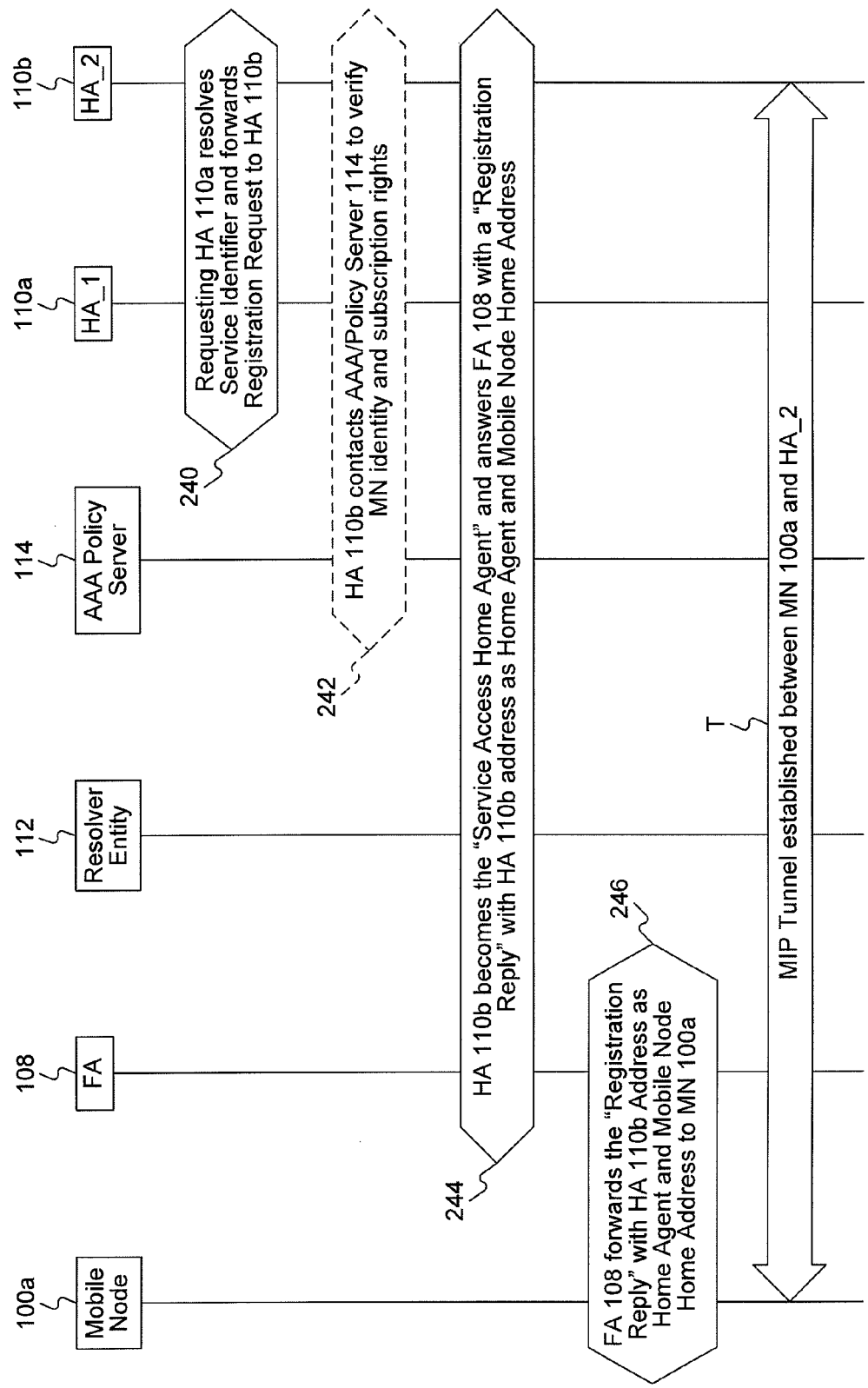
FIG. 12 shows a scenario of so-called "Redirecting Home Agent" usage that redirects the signaling messages back to the Mobile Node.

In FIG. 12, the "Requesting Home Agent" 110a understands that there is not a "Service Access Home Agent" available for the requested service. In a step 240 the "Requesting Home Agent" 110a can try to resolve (by itself or in general using the Resolver 112) the Service Identifier and forwards the Mobile IPv4 "Registration Request" message to the resolved IP address of the new Home Agent, lob. At this point the new Home Agent, 110b, receiving the Mobile IPv4 "Registration Request" message from the "Requesting Home Agent" 110a, can optionally verify, in a step 242, with an AAA server 114, and/or a Service Policy server 114 that could be located in the owning and/or in the roaming network, the Mobile Node identity and the subscription rights. So the second Home Agent, 110b, becomes a "Service Access Home Agent", for the Mobile Node 100a, and, in a step 244, answers to the Foreign Agent 108 with a Mobile IPv4 "Registration Reply", carrying the Mobile Node Home address owning to the "Service Access Home Agent" sub-network (so the "Service Access Home Agent" sub-network becomes the Home Network for the Mobile Node 110a for that particular service). Finally, in a step 246, the Foreign Agent 108 forwards this message to the Mobile Node 100a. The "Requesting Home Agent" 110a may perform the Mobile Node identity and subscription check, after reception of the request.

In this case, a MIP tunnel T for the selected service is established between the Mobile Node 100a and the Home Agent HA_2, 110b.

In the case of absence of Foreign Agent, i.e. with a Co-located Care-of Address (which apply both to an IPv4 and to an IPv6 network), the Mobile Node 100b executes the same operation of the Foreign Agent 108 resolving the Service Identifier using a Resolver 112 (which could be for a example a Domain Name Server). The Mobile Node 100b obtains the IP address of the Home Agent 110b that is in charge of providing the access to that particular service (i.e. the address of the "Service Access Home Agent" as previously defined). At this point the Mobile Node 100b sends a Mobile IPv4 "Registration Request" message (or a Mobile IPv6 Binding Update message) to the Home Agent 110b obtained at previous step (i.e. the "Service Access Home Agent") indicating which service the Mobile Node 100b wants to access by means of the Service Identifier field.

After receiving this message, the Home Agent 100b replies to the Mobile Node 100b with a Mobile IPv4 "Registration Reply" message (or a Mobile IPv6 Binding Acknowledgement message) communicating to the Mobile Node 100b its own Home Address.

If the Mobile Node 100b wants to access a service, different from the one currently received, the Mobile Node 100b sends a new Mobile IPv4 "Registration Request" message (or a new Mobile IPv6 Binding Update message) to a new Home Agent (whose IP Address is obtained interrogating the Resolver 112) for the new service.

If the Mobile Node is already accessing a service through a different Home Agent (whose address is already known by the Mobile Node), the Mobile Node itself could decide to use the Home Agent (e.g. a default Home Agent) through which it was receiving the previous service, thus sending the Mobile IPv4 "Registration Request" message (or the Mobile IPv6 Binding Update message) to the old Home Agent carrying the new Service Identifier. Then this Home Agent, namely the "Requesting Home Agent", resolves the Service Identifier (eventually using the Resolver) and finds the correct Home Agent, namely the "Service Access Home Agent" from which the specified service can be provided.

At this point the "Requesting Home Agent" can behave in different ways.

As a first option the "Requesting Home Agent" can forward the Mobile. IPv4 "Registration Request" message (or the Mobile IPv6 Binding Update message) to the "Service Access Home Agent". The "Service Access Home Agent" resolves the Service Identifier and sends the Mobile IPv4 "Registration Reply" message (or the Mobile IPv6 Binding Acknowledgement message) through the "Requesting Home Agent", assigning to the Mobile Node the opportune Home Address. In this case, the "Requesting Home Agent" acts as a proxy for the Mobile Node data, in the sense that it receives the data coming from the "Service Access Home Agent" and forwards them to the Mobile Node Care-of Address. This approach implies establishing a tunnel (static or dynamic) between the "Requesting Home Agent" and "Service Access Home Agent". This has the advantage that when the Mobile Node changes its Care-of Address, the Mobile Node must inform (irrespective of how many services it is accessing) only one Home Agent, that is the "Requesting Home Agent". Moreover, the "Requesting Home Agent" communicates with the "Service Access Home Agent" to forward the Mobile Node data to it, so that the "Service Access Home Agent" has a Binding table made by three entries: Mobile Node Home address, Mobile Node Care-of Address and Mobile Node "Requesting Home Agent". In this case, the "Requesting Home Agent" behaves like an "Anchor Home Agent" for all services accessed by the Mobile Node (this case is similar to the case shown in FIG. 10 where the Foreign Agent and the Mobile Node are incorporated to one element, so that the messages between them are on an internal interface).

Another option provides for the "Requesting Home Agent" replying to the Mobile Node with a negative Mobile IPv4 "Registration Reply" message (or the Mobile IPv6 Binding Acknowledgement message) informing (with appropriate failure cause) that the Home Agent address has been resolved in a wrong way. In case of negative updating, the Mobile IPv4 "Registration Reply" message (or the Mobile IPv6 Binding Acknowledgement message) sent by the Home Agent to the Mobile Node could also carry the address of a Home Agent available to provide the requested service (this is a "Home Agent redirection" used for example for service load balancing). This case is similar to the case shown in FIG. 11 where the Foreign Agent and the Mobile Node are incorporated to one element and thus the messages between them are on an internal interface.

As a further option, the "Requesting Home Agent" may understand that there is no "Service Access Home Agent" available for the requested service. At this point the "Requesting Home Agent" can try to resolve (by itself or using the Resolver) the Service Identifier and forward the Mobile IPv4 "Registration Request" message (or the Mobile IPv6 Binding Update message) to the resolved IP address of the new Home Agent. The Home Agent receiving the Mobile IPv4 "Registration Request" message (or the Mobile IPv6 Binding Update message) from the "Requesting Home Agent", can optionally verify with an AAA server and/or a Service Policy server (which could be located in the owning and/or in the roaming network) the Mobile Node identity and subscription rights. So the "Requesting Home Agent" becomes a "Service Access Home Agent" for that particular Mobile Node and replies to the Mobile Node directly with a Mobile IPv4 "Registration Reply" message (or the Mobile IPv6 Binding Acknowledgement message), carrying the Mobile Node Home Address owning to the "Service Access Home Agent" sub-network. In that way, the Service Access Home Agent sub-network becomes the Home Network for the Mobile Node for that particular service. This case is similar to the one shown in FIG. 12 where the Foreign Agent and the Mobile Node are incorporated to one element and the messages between them are on an internal interface. The "Requesting Home Agent" may also perform the Mobile Node identity and subscription check, after reception of the request.

When a Mobile Node wishes to discontinue the reception of a particular service, it starts a "Service Deregistration Procedure" based on Mobile IP signaling. This procedure implies that the Mobile Node sends a Mobile IPv4 "Registration Request" message to the Foreign Agent that forwards it to the "Service Access Home Agent" (or the Mobile IPv6 Binding Update message directly sent to the "Service Access Home Agent") informing that the Mobile Node is deregistering for that particular Service Identifier. The correct reception of this message implies that the "Service Access Home Agent" cancels the binding for that service and for that Mobile Node, both for Mobile IPv4 and Mobile IPv6 usage (moreover in case of Foreign Agent usage, the Foreign Agent de-allocates also the registered Care-of Address for that Mobile Node).

The tunnel between a "Service Access Home Agent" and a Mobile Node could be still in place even if the Mobile Node deregisters for a particular service controlled by that "Service Access Home Agent". This is because the same "Service Access Home Agent" can control the access to different services.

In case of "Proxy Home Agent" usage (shown in FIG. 5) where the Proxy Home Agent 110*a* acts as an "Anchor Home Agent", the Mobile IPv4 "Registration Request" message (or the Mobile IPv6 Binding Update message) with the Service Identifier (that indicates the service for which a deregistration is needed) is received by the "Requesting Home Agent". At this point the "Requesting Home Agent" sends a Mobile IPv4 "Registration Request" message (or the Mobile IPv6 Binding Update message) indicating to the correct "Service Access Home Agent" (on the basis of the Service Identifier) that the "Inter-Home Agent Tunnel", 300, between them has to be cancelled. Than the "Service Access Home Agent" cancel the binding for that Mobile Node and the "Anchor Home Agent" cancels the binding for that Mobile Node and for that Service Identifier.

The messages exchange is shown in FIG. 2. There, two Mobile Nodes are shown, namely a first Mobile Node (MN_a, indicated 100*a*) using the option of Foreign Agent Care-of Address (which is possible using only Mobile IPv4 protocol) and a second Mobile Node (MN_b, indicated 110*b*) using the option of Co-located Care-of Address (which is possible using both Mobile IPv4 and Mobile IPv6 protocols). FIG. 2 shows the case of a Mobile Node 100*a* receiving the services A, B and C through the Home Agent_1, indicated 110*a*, and the services E and F from the Home Agent_2, indicated 110*b*. Both these Home Agents are located in the Home network 102, but the same services can be obtained also through the Foreign network 104 (as in the case of services A and B for the Mobile Node 100*a*) on the basis of particular policy agreement between the Home network 102 and the Foreign network 104. It is also possible to access to the services provided only in the Foreign network 104 (service G for the Mobile Node 100*a*) if the policy allows the Mobile Node 100*a* to do that. The local services A, B and G are accessed by the Home Agent HA_3, indicated 110*c*, in the Foreign network. The same applies for the Mobile Node MN_b, indicated 100*b*, which accesses to the Home network services A, B and C through the Home Agent HA_1, 110*a*, and services E and F through the Home Agent HA_2, 110*b*. The Mobile Node in question can also access locally in the Foreign network services A and H through the Home Agent HA_4, indicated 100*d*, based on the policy agreed between the Foreign 106 and Home 102 networks.

Figure 13:
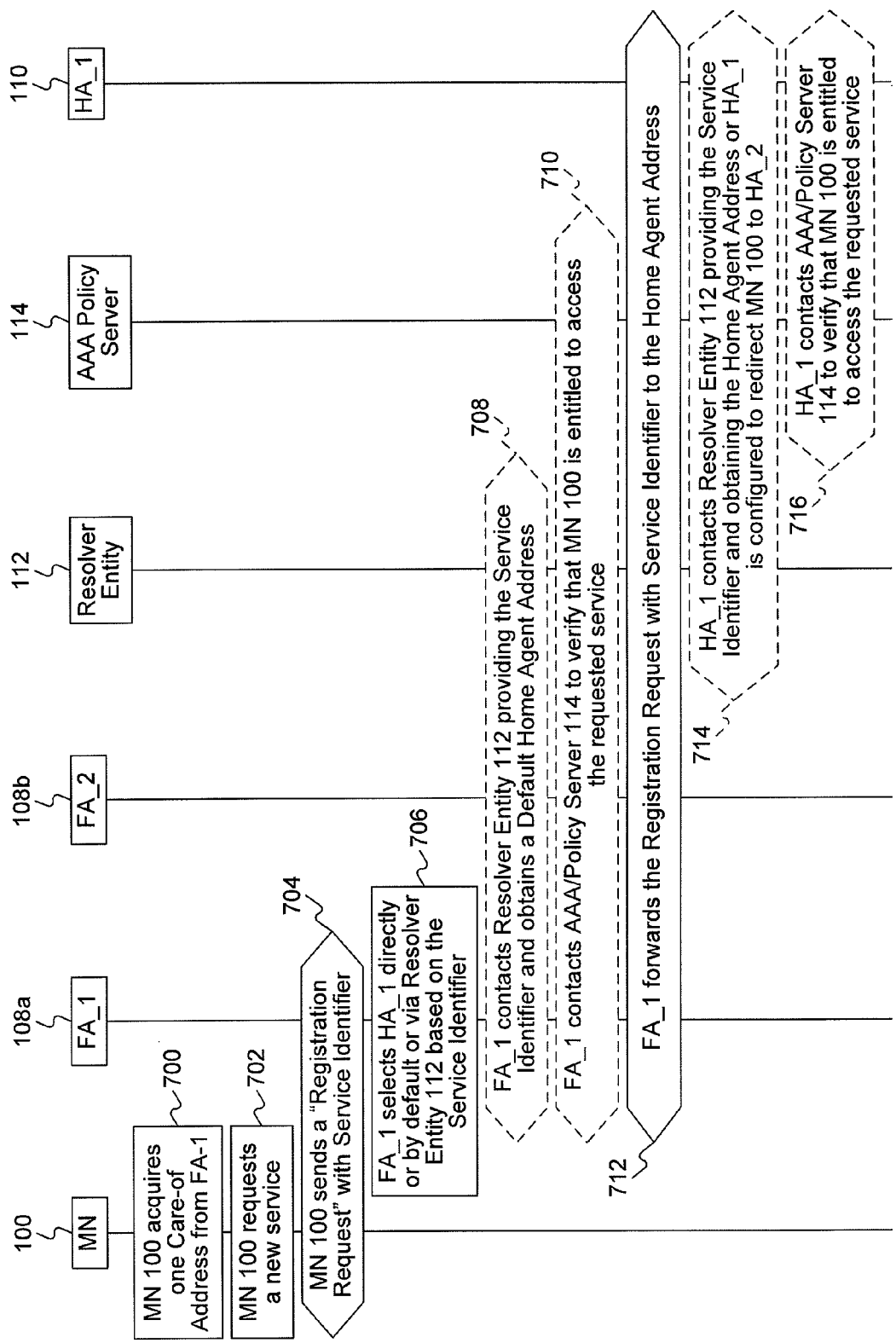
FIG. 13 illustrates the preliminary messages exchange in case the selected Foreign Agent is incorrect.
Figure 14:
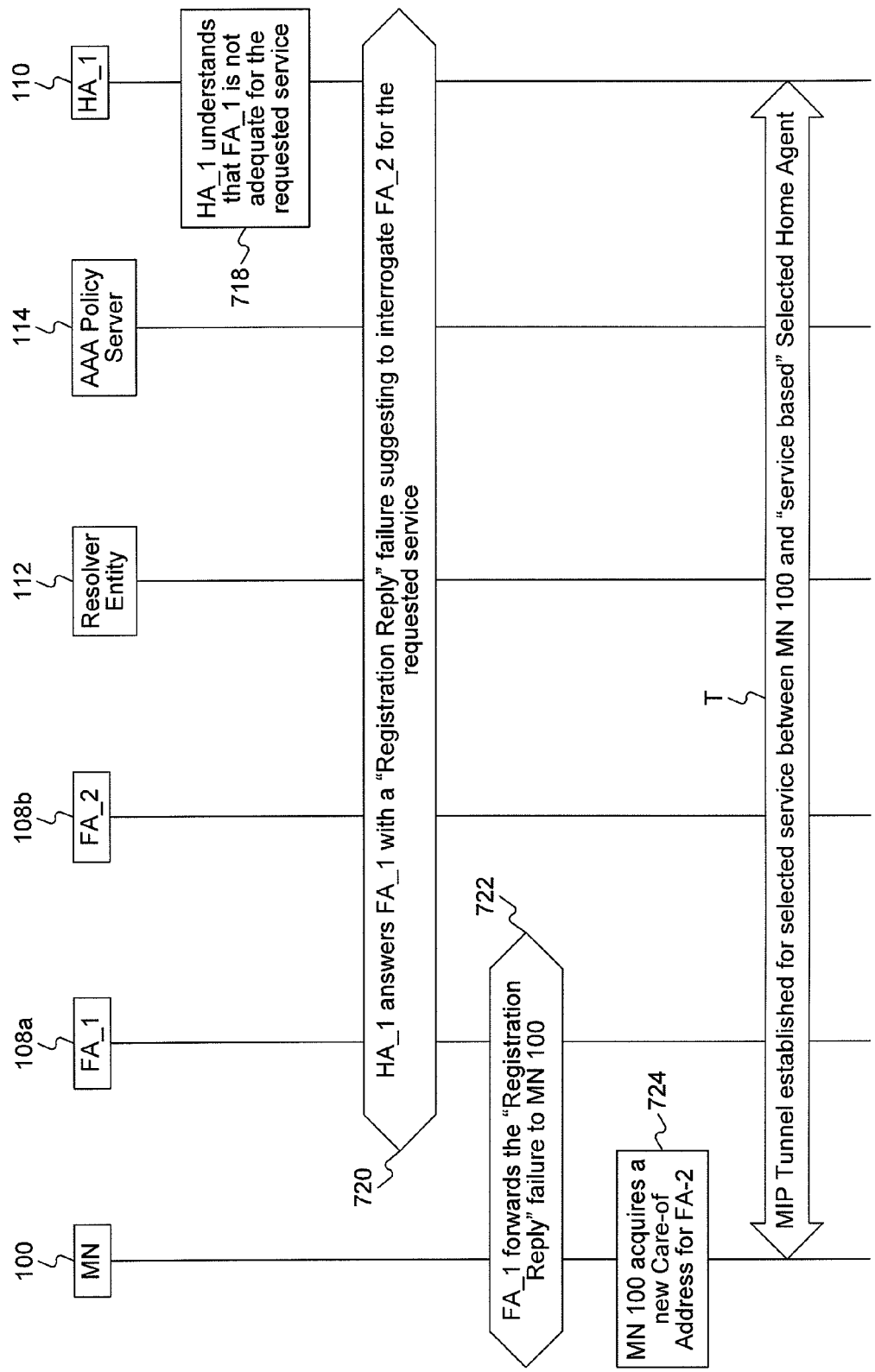
FIG. 14 shows a scenario of so-called "Redirecting Foreign Agent" usage that redirects the signaling messages back to the Mobile Node.
Figure 15:
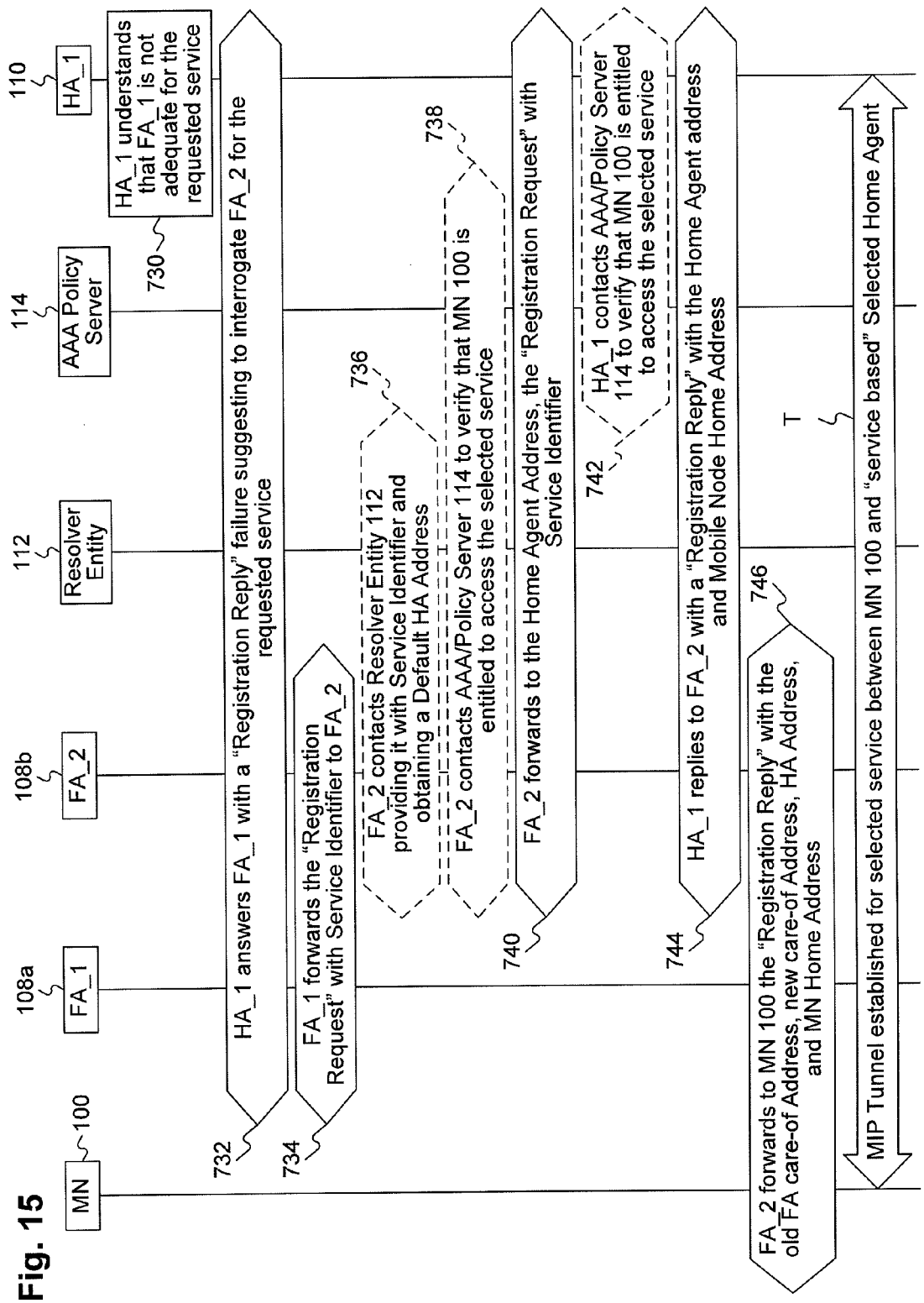
FIG. 15 shows a scenario of so-called "Redirecting Foreign Agent" usage that redirects the signaling messages to a new Foreign Agent.

FIGS. 13, 14 and 15 show the case of Foreign Agent Redirection from one Foreign Agent to another, dictated by different causes (e.g. one Foreign Agent not being able to provide a service acceptably in term of Quality of Service or Security, etc.). The message exchange is quite similar to those related to the Home Agent Redirection (shown in FIG. 9), and both FIGS. 14 and 15 related to the case where the Home Agent signals to the Foreign Agent FA_1, indicated 108*a* that the Mobile IPv4 Registration Request is not accepted. This signalling message carries also the address of the Foreign Agent, indicated 108*b*, that is able to provide the requested service as specified by the Service Identifier (which is also a "default Foreign Agent").

The main difference between the situations depicts in FIG. 14 and FIG. 15 lies in that the Foreign Agent FA_1, 108*a* (FIG. 14) can send the Mobile IPv4 Registration Reply back to the Mobile Node, which is then in charge of attempting a new registration with the provided Foreign Agent address (FA_2) or the Foreign Agent FA_1 (FIG. 15) can forward the previously stored Mobile IPv4 Registration Request to the provided Foreign Agent address (FA_2) on behalf of the Mobile Node.

FIG. 13 shows a preliminary message exchange in case the selected Foreign Agent is incorrect.

In a step 700 the Mobile Node 100 acquires one Care-of Address from the Foreign Agent FA_1, 108*a*. In a step 702 the Mobile Node 100 requests a new service. The Mobile Node 100 thus sends, in a step 704, a Mobile IP "Registration Request" with Service Identifier. Based on the Service Identifier the Foreign Agent FA_1, 108a, selects, in a step 706, the Home Agent HA_1 directly or by default or via a Resolver 112. In a step 708 the Foreign Agent FA_1, 108a, contacts the Resolver 112 providing it with the Service Identifier and obtaining a DEFAULT Home Agent address. In a step 710, the Foreign Agent FA_1 contacts the AAA/Policy server 114 in owning/roaming network to verify that the Mobile Node 100 is entitled to access that service. The Foreign Agent FA_1 forwards to the Home Agent address the Mobile Ipv4 "Registration Request" with Service Identifier in a step 712. In a step 714, the Home Agent HA_1 contacts the Resolver 112 providing it with the Service Identifier and obtaining the Home Agent address or the Home Agent HA_1 is configured to redirect Mobile Node to a second Home Agent HA_2 for some reasons. In a step 716, the Home Agent HA_1 contacts the AAA/Policy server 114 in owning/roaming network to verify that the Mobile Node 100 is entitled to access that service.

At this point two different situations can occur.

In the situation shown in FIG. 14, the Home Agent HA_1 110 understands, in a step 718, that the Foreign Agent FA_1, 108a, is not adequate for accessing that service. In the step 720, the Home Agent HA_1 110 answers to the Foreign Agent FA_1, 108a, with a Mobile IP "Registration Reply" failure suggesting to interrogate the Foreign Agent FA_2 address for the requested service. The Foreign Agent FA_1 forwards to the Mobile Node 100, in a step 722, the Mobile IP "Registration Reply" failure suggesting to interrogate the Foreign Agent FA_2 address for the requested service. In a step 724 the Mobile Node 100 acquires a new Care-of Address from the Foreign Agent FA_2, 108b.

In this case, a MIP tunnel T is established for the selected service between the Mobile Node 100 and the "service-based" selected Home Agent in redirecting Foreign Agent back to the Mobile Node.

In the situation shown in FIG. 15 the Home Agent HA_1 110 understands, in a step 730, that the Foreign Agent FA_1, 108a, is not adequate for accessing that service. In a step 732, the Home Agent HA_1 110 replies to the Foreign Agent FA_1, 108a, with a Mobile IP "Registration Reply" failure suggesting to interrogate the Foreign Agent FA_2 address for the requested service. The Foreign Agent FA_1, 108a, forwards to the Foreign Agent FA_2, 108b, the Mobile IP "Registration Request" with the Service Identifier, in a step 734. In a step 736, the Foreign Agent FA_2, 108b, contacts the Resolver 112 providing it with the Service Identifier and obtaining a DEFAULT Home Agent address. In a step 738, the Foreign Agent FA_2, 108b, contacts the AAA/Policy server 114 in owning/roaming network to verify that the Mobile Node 100 is entitled to access that service. The Foreign Agent FA_2, 108b, forwards to the Home Agent address, the Mobile IP "Registration Request" with the Service Identifier. This occurs in a step 740, while in a step 742 the Home Agent HA_1 contacts the AAA/Policy server 114 in owning/roaming network to verify that the Mobile Node 100 is entitled to access that service. In a step 744, the Home Agent HA_1 replies to the Foreign Agent FA_2, 108b, with a Mobile IP "Registration Reply" with the Home Agent address and the Mobile Node Home Address. In a step 746, the Foreign Agent FA_2, 108b, forwards to the Mobile Node 100 the Mobile Ipv4 "Registration Reply" with the old Foreign Agent Care-of Address, the new Care-of Address, the Home Agent address and the Mobile Node Home Address.

In this case, a MIP tunnel T is established for the selected service between the Mobile Node 100 and the "service-based" selected Home Agent in redirecting Foreign Agent through a new Foreign Agent.

In the case the Foreign Agent is co-located with the Mobile Node (in case of Mobile IPv4 or Mobile IPv6 usage) the messages between them are exchanged on an internal interface and the Mobile Node acquires by itself the Care-of Address.

Consequently, without prejudice to the underlying principles of the invention, the details and the embodiments may vary, also appreciably, with reference to what has been described by way of example only, without departing from the scope of the invention as defined by the annexed claims.

The invention claimed is:

1. A method of controlling operation of a communication network wherein at least one node requests services adapted to be provided via a plurality of home agents comprising the steps of:
having a first service identifier identifying a first service requested by said at least one node, wherein the at least one node is a mobile node;
having a second service identifier identifying a second service requested by said at least one node; and
selecting out of said plurality at least one first home agent to provide said first service requested and at least one second home agent to provide said second service requested, wherein said at least one first home agent and at least one second home agent are selected based on said first service identifier and said second service identifier, respectively, such that the mobile node is concurrently associated with the at least one first home agent and the at least one second home agent.

2. The method of claim 1, comprising the step of configuring said at least one first home agent or said at least one second home agent to selectively deny said first service requested or second service requested, based on said first or second service identifier, respectively.

3. The method of claim 1, wherein the network comprises a set of networks comprising a home network adapted to authenticate said at least one node and at least one foreign network adapted to be visited by said at least one node.

4. The method of claim 1, comprising the step of associating with at least one of said first service identifier or second service identifier an extension of said first or second service identifier indicative of at least one of:
a quality of service level requested for said service,
security data to be used in providing said service, and
authentication data for said requester node.

5. The method of claim 1, comprising the step of resolving at least one of said first service identifier and second service identifier to generate an IP address for said at least one first or second home agent selected.

6. The method of claim 1, comprising the step of resolving said first and second service identifiers to generate respective IP addresses for said at least one first home agent selected and said at least one second home agent selected.

7. The method of claim 1, comprising the step of providing simultaneously said first service requested and said second service or more requested via said at least one first home agent selected and said at least one second home agent selected.

8. The method of claim 1, comprising the step of assigning to said at least one node at least one first home address and at least one second home address for use with said at least one first home agent selected and said at least one second home agent selected, respectively.

9. The method of claim 8, comprising the steps of:
associating, with at least one of said first and said second home agents selected, a respective set of correspondent nodes to said at least one node;
communicating, to at least one of said first and said second home agents selected, a list of selected correspondent nodes in the respective set of correspondent nodes, the list identifying the correspondent nodes that should be informed of at least one of the first and second home addresses; and
propagating said at least one of the first and second home addresses from said at least one of said first and said second home agents selected to said list of correspondent nodes.

10. The method of claim 1, comprising the step of making available at least one foreign agent entity to perform said steps of providing at least one request identifier and selecting said at least one home agent.

11. The method of claim 10, comprising the step of co-locating said foreign agent entity with said node.

12. A tangibly embodied computer readable medium encoded with a computer program product loadable into a memory of at least one computer and comprising software code portions for performing the method of claim 1.

13. A system for controlling operation of a communication network wherein at least one node requests services adapted to be provided via a plurality of home agents, comprising:
at least one node configured for having associated a first service identifier identifying a first service requested by said at least one node and configured for having a second service identifier identifying a second service requested by said at least one node, wherein the at least one node is a mobile node; and
a system configured for selecting out of said plurality at least one first home agent to provide said first service requested and at least one second home agent to provide said second service requested, wherein said at least one first home agent and at least one second home agent are selected based on said first service identifier and said second service identifier, respectively, such that the mobile node is concurrently associated with the at least one first home agent and the at least one second home agent.

14. The system of claim 13, comprising said at least one of first home agent or said second home agent being configured to selectively deny said first service requested or second service requested, based on said first or second service identifier, respectively.

15. The system of claim 13, wherein the network comprises a set of networks comprising a home network adapted to authenticate said at least one node and at least one foreign network adapted to be visited by said at least one node.

16. The system of claim 13, comprising an extension of said first service identifier or second service identifier associated with at least one of said first or second service identifier and indicative of at least one of:
a quality of service level requested for said service,
security data to be used in providing said service, and
authentication data for said requester node.

17. The system of claim 13, comprising at least one resolver configured for the step of resolving at least one of said first service identifier and said second service identifier to generate an IP address for said at least one first or second home agent selected.

18. The system of claim 13, comprising said at least one resolver configured for resolving said first and second service identifiers to generate respective IP addresses for said at least one first home agent selected and said at least one second home agent selected.

19. The system of claim 13, comprising said at least one first home agent selected and said at least one second home agent selected configured for providing simultaneously said first service requested and said second service requested, respectively.

20. The system of claim 13, comprising said at least one node configured for being assigned at least one first home address and at least one second home address for use with said at least one first home agent selected and said at least one second home agent selected, respectively.

21. The system of claim 20, comprising:
a respective set of correspondent nodes to said at least one node associated with at least one of said first and said second home agents selected;
at least one of said first and said second home agents selected configured to receive a list of selected correspondent nodes in the respective set of correspondent nodes, the list identifying the correspondent nodes that should be informed of at least one of the first and second home addresses; and
at least one of said first and said second home agents selected configured for propagating said home address to said list of correspondent nodes.

22. The system of claim 13, comprising at least one foreign agent entity configured for performing said steps of providing at least one request identifier and selecting said at least one home agent.

23. The system of claim 22, wherein said foreign agent entity is co-located with said node.

24. A communication network comprising at least one node configured for requesting services and a plurality of home agents configured for providing said services, comprising a system according to claim 13.

* * * * *